US010733576B2

(12) United States Patent
Yu et al.

(10) Patent No.: US 10,733,576 B2
(45) Date of Patent: Aug. 4, 2020

(54) OPTIMIZED ONLINE MARKETING AND SCHEDULING SYSTEMS AND METHODS THAT ARE BASED ON DRIVING DEMAND FOR SERVICES

(71) Applicants: Robert Yu, Newton Upper Falls, MA (US); Surya Prakash, Burlington, MA (US)

(72) Inventors: Robert Yu, Newton Upper Falls, MA (US); Surya Prakash, Burlington, MA (US)

( * ) Notice: Subject to any disclaimer, the term of this patent is extended or adjusted under 35 U.S.C. 154(b) by 0 days.

(21) Appl. No.: 16/201,892

(22) Filed: Nov. 27, 2018

(65) Prior Publication Data

US 2019/0172019 A1    Jun. 6, 2019

Related U.S. Application Data

(63) Continuation of application No. 15/680,731, filed on Aug. 18, 2017, now Pat. No. 10,169,742, which is a continuation of application No. 13/801,430, filed on Mar. 13, 2013, now Pat. No. 9,741,021.

(60) Provisional application No. 61/754,356, filed on Jan. 18, 2013.

(51) Int. Cl.
*G06Q 10/10* (2012.01)
(52) U.S. Cl.
CPC .................. *G06Q 10/1095* (2013.01)
(58) Field of Classification Search
USPC ............................................ 705/7.11–7.42
See application file for complete search history.

(56) References Cited

U.S. PATENT DOCUMENTS

| 2002/0116266 | A1   | 8/2002  | Marshall |
|---|---|---|---|
| 2002/0128934 | A1 * | 9/2002  | Shaer .................. G06Q 10/087 705/14.4 |
| 2002/0188511 | A1   | 12/2002 | Johnson et al. |
| 2003/0061087 | A1 * | 3/2003  | Srimuang ........ G06Q 10/06314 705/7.18 |
| 2009/0164236 | A1 * | 6/2009  | Gounares ............... G06Q 10/00 705/2 |

(Continued)

OTHER PUBLICATIONS

Roth, Alvin E., "What have we learned from market design?", National Bureau of Economic Research, Cambridge MA, Oct. 2007, pp. 1-43 (Year: 2007).*

(Continued)

*Primary Examiner* — Amber A Misiaszek
(74) *Attorney, Agent, or Firm* — Foley & Lardner LLP

(57) ABSTRACT

In some aspects, the disclosure is directed to methods and systems for driving demand for services. An appointment platform operating on a server may identify, based on an appointment inventory of a service provider, an open appointment to be filled. The appointment platform may rank a plurality of users to which the open appointment may be offered. The appointment platform may rank a user of the plurality of users based on a current membership score of the user. The appointment platform may determine, based on the ranking, to offer the user the open appointment. The appointment platform may identify, based on the current membership score of the user, a type of incentive from a plurality of types of incentives, to offer to the user for filling the open appointment.

20 Claims, 20 Drawing Sheets

(56) References Cited

U.S. PATENT DOCUMENTS

| | | |
|---|---|---|
| 2010/0070295 A1 | 3/2010 | Kharraz Tavakol et al. |
| 2010/0070296 A1 | 3/2010 | Massoumi et al. |
| 2010/0070297 A1 | 3/2010 | Kharraz Tavakol et al. |
| 2010/0070303 A1* | 3/2010 | Massoumi ............ G06Q 10/109 705/3 |
| 2010/0228564 A1 | 9/2010 | Kharraz Tavakol et al. |
| 2010/0287103 A1 | 11/2010 | Mason |
| 2011/0173062 A1 | 7/2011 | Chen et al. |
| 2011/0191122 A1 | 8/2011 | Kharraz Tavakol et al. |
| 2011/0238474 A1* | 9/2011 | Carr .................. G06Q 30/0639 705/14.23 |
| 2011/0246306 A1* | 10/2011 | Blackhurst ............ G06Q 30/02 705/14.58 |
| 2011/0270643 A1 | 11/2011 | Reichman |
| 2012/0004943 A1 | 1/2012 | Reichman |
| 2012/0245971 A1 | 9/2012 | Reichman et al. |
| 2012/0278140 A1 | 11/2012 | Mercuri et al. |
| 2013/0103420 A1 | 4/2013 | Massoumi et al. |

OTHER PUBLICATIONS

Notice of Allowance on U.S. Appl. No. 15/680,731 dated Aug. 29, 2018.

U.S. Notice of Allowance for U.S. Appl. No. 13/801,430 dated Apr. 19, 2017.

U.S. Office Action for U.S. Appl. No. 13/801,430 dated Oct. 21, 2016.

U.S. Office Action for U.S. Appl. No. 13/801,430 dated Apr. 11, 2016.

U.S. Office Action for U.S. Appl. No. 13/801,430 dated Aug. 28, 2015.

U.S. Office Action for U.S. Appl. No. 13/801,430 dated Apr. 15, 2014.

U.S. Office Action for U.S. Appl. No. 13/801,430 dated Jul. 29, 2013.

U.S. Office Action for U.S. Appl. No. 13/801,430 dated Nov. 5, 2014.

* cited by examiner

*Fig. 2K*

BLOG | ABOUT US | HOW IT WORKS | FAQ | PRESS | JOBS | PARTNERS | CONTACT ustandby
APPOINTMENT MARKET

Available Now? Jump In & Reward Yourself!

Find premium appointments & same day openings

CLEANINGS
Today @ 2PM Get a $25

---

STEP 1
DISCOVER
Browse premier service openings from personal care, spa & salon, dentists to doctors.

STEP 2
RESERVE
Find the perfect service at the right time and book the appointment with USTANDBY.

STEP 3
BENEFIT
Access to scarce openings with premium service providers or act fast, take a same day appointment

OPTIMIZED ONLINE MARKETING AND SCHEDULING SYSTEMS AND METHODS THAT ARE BASED ON DRIVING DEMAND FOR SERVICES

RELATED APPLICATIONS

This application is a continuation of and claims priority to U.S. Non-Provisional application Ser. No. 15/680,731 filed Aug. 18, 2017, entitled "OPTIMIZED ONLINE MARKETING AND SCHEDULING SYSTEMS AND METHODS THAT ARE BASED ON DRIVING DEMAND FOR SERVICES" which in turn is a continuation of and claims priority to U.S. Non-Provisional application Ser. No. 13/801,430 filed Mar. 13, 2013, entitled "OPTIMIZED ONLINE MARKETING AND SCHEDULING SYSTEMS AND METHODS THAT ARE BASED ON DRIVING DEMAND FOR SERVICES", which claims priority to U.S. Provisional Application No. 61/754,356, filed Jan. 18, 2013, entitled "AN OPTIMIZED ONLINE MARKETING AND SCHEDULING SYSTEM AND METHOD THAT IS BASED ON DRIVING DEMAND FOR SERVICES", all of which are hereby incorporated by reference in entirety for all purposes.

FIELD OF THE DISCLOSURE

This disclosure generally relates to methods and systems that are based on driving demand for services. In particular, this disclosure relates to optimized online marketing and scheduling methods and systems that are based on driving demand for services.

BACKGROUND OF THE DISCLOSURE

Service providers who rely on appointments or reservations sometimes struggle with openings in their calendar due to rescheduling, cancellations, no shows, as well as inconvenient time slots. Calendar appointment booking capacity can be significantly impacted (e.g., by 20-50%) based on these factors. Current methods for handling these dynamic schedule changes may include contacting dormant clients, attempts to shift appointments around, or overbooking an appointment. In most cases, these continue to be a manual, tedious process (i.e., contacting clients by phone), and may risk alienating some customers. In any case, industry standard fulfillment rates are reportedly only at about 20% for filling these openings.

At the other end of the spectrum, service providers may have a long wait list for the most convenient or desirable time slots, because of work, school, seasonal or other schedule-related factors that can cause demand to spike in these time slots. In certain cases, the service provider may accommodate urgent requests for these time-slots by utilizing a waiting list and using a manual, inefficient process to manage any last-minute openings. Booking an appointment far into the future has also been shown to increase the likelihood of cancellations or reschedules, thus feeding into problems such as cancellations, no shows, etc. It is estimated that about 40% of appointments scheduled more than 20 days ahead eventually get canceled or result in no-shows. It has been a challenge for service providers to bridge the imbalance in demand for services.

BRIEF SUMMARY OF THE DISCLOSURE

Described herein are optimized online marketing and scheduling methods and systems that are based on driving demand for services. The present systems and methods provide an automatic appointment optimization solution that can maximize revenue of a service provider. The present systems and methods may leverage on incentives and/or loyalty points to drive demand for a service provider's services or products. Users may each be assigned a membership score based on a plurality of factors, which may include a past record of consumption of services, a willingness to fill an open service appointment, whether payments for services were prompt, and the users' reliability or punctuality in fulfilling obligations of their appointments. For example, an appointment platform may dynamically update and utilize such scores to rank or assign weights to users, and to determine incentives or premiums to capture new customers, re-activate dormant customers, and/or build loyalty with active customers. The present systems and methods can also place more choice and/or control in the customer's hands, by allowing customers to define their preferences, accumulate loyalty rewards, get access to what appointment slots are available for a provider or across a number of providers, and determine if the available appointment slots are convenient for them. These users or customers may determine if any of these slots are sufficiently convenient or worthwhile to fill in view of the types and levels of incentives offered to them for filing those appointment slots.

In some aspects, the disclosure is directed to a method for driving demand for services. The method may include identifying, by an appointment platform operating on a server, based on an appointment inventory of a service provider, an open appointment to be filled. The appointment platform may rank a plurality of users to which the open appointment may be offered. The ranking may include ranking a user of the plurality of users based on a current membership score of the user. The appointment platform may determine, based on the ranking, to offer the user the open appointment. The appointment platform may identify, based on the current membership score of the user, a type of incentive from a plurality of types of incentives, to offer to the user for filling the open appointment.

In some embodiments, the appointment platform ranks the user based on the current membership score. The current membership score may be determined based on at least one of: a past appointment record of the user, a past payment record of the user, a record of services consumed or scheduled by the user, length of the user's membership, the user's adherence to the provider's service recommendations, revenue potential from the user, proximity of the user to the service provider's location, and the user's insurance plan or other payment method for service rendered by the service provider. The appointment platform may rank the plurality of users comprising at least one of: wait-listed users, users booked for a different appointment, and users due for an appointment. The appointment platform may select a pre-defined number of highest-ranked users from the plurality of users, to which the open appointment is offered. The appointment platform may select a pre-defined number of highest-ranked users from the plurality of users, to which the open appointment is offered, and assigning the open appointment to a first user from the highest-ranked users to accept the offer.

In some embodiments, the appointment platform identifies the type of incentive if it is determined that the user should be offered the open appointment. The appointment platform may identify the type or a level of incentive based at least in part on one or more of: weather condition, local condition, proximity in time to that of the open appointment, and amount of interest from users at that time. The appointment platform may identify the type or a level of the incentive based on historical appointment utilization data from the service provider, and a type of service offered with the open appointment. In certain embodiments, the appointment platform may identify a type of incentive comprising at least one of: a reward point, a credit towards future services, a gift card or certificate, and a discount. The appointment platform may update the user's membership score based on at least one of the user accepting to till the open appointment, the user's subsequent cancellation of the appointment, the user's attendance at or absence from the appointment, and the user's punctuality at the appointment.

In some aspects, the disclosure is directed to a system for driving demand for services. The system may include an appointment engine operating on a server. The appointment engine may identify an open appointment to be filled based on an appointment inventory of a service provider. The appointment engine may rank a plurality of users to which the open appointment may be offered. The appointment engine may rank a user of the plurality of users based on a current membership score of the user. The appointment engine may determine to offer the user the open appointment based on the ranking. The system may also include an incentive engine, identifying, based on the current membership score of the user, a type of incentive from a plurality of types of incentives, to offer to the user for filling the open appointment.

In some embodiments, the appointment engine ranks the user based on the current membership score. The appointment engine may determine the current membership score based on at least one of: a past appointment record of the user, a past payment record of the user, a record of services consumed or scheduled by the user, length of the user's membership, the user's adherence to the provider's service recommendations, revenue potential from the user, proximity of the user to the service provider's location, and the user's insurance plan or other payment method for service rendered by the service provider. The appointment engine may rank the plurality of users comprising at least one of: wait-listed users, users booked for a different appointment, and users due for an appointment. In certain embodiments, the appointment engine selects a pre-defined number of highest-ranked users from the plurality of users, to which the open appointment is offered. The appointment engine may select a pre-defined number of highest-ranked users from the plurality of users, to which the open appointment is offered, and may assign the open appointment to a first user from the highest-ranked users to accept the offer.

In certain embodiments, the incentive engine identifies the type of incentive if it is determined that the user should be offered the open appointment. The incentive engine may identify the type or a level of incentive based at least in part on one or more of: weather condition, local condition, proximity in time to that of the open appointment, and amount of interest from users at that time. The incentive engine may identify the type or a level of the incentive based on historical appointment utilization data from the service provider, and a type of service offered with the open appointment. The incentive engine may identify a type of incentive comprising at least one of: a reward point, a credit towards future services, a gift card or certificate, and a discount. The appointment engine may update the user's membership score based on at least one of: the user accepting to fill the open appointment, the user's subsequent cancellation of the appointment, the user's attendance at or absence from the appointment, and the user's punctuality at the appointment.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 2K-2P depict embodiments of screenshots of interfaces provided by an optimized online marketing and scheduling system disclosed herein.

Figure 1A:
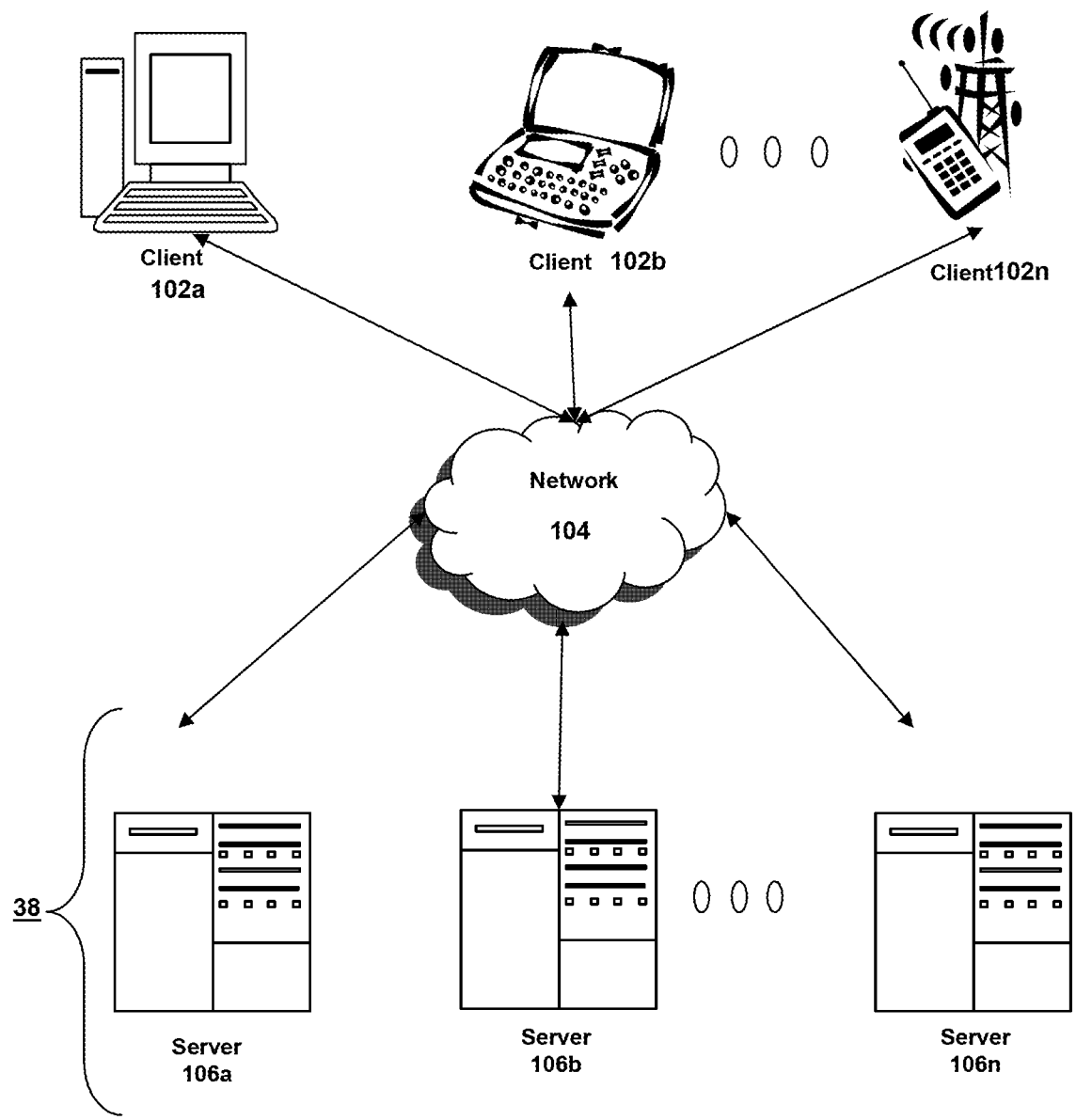
FIG. 1A is a block diagram depicting an embodiment of a network environment comprising client machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of optimized online marketing and scheduling methods and systems that are based on driving demand for services.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, clients) 101, client node(s) 101, client machine(s) 101, client computers) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 206b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
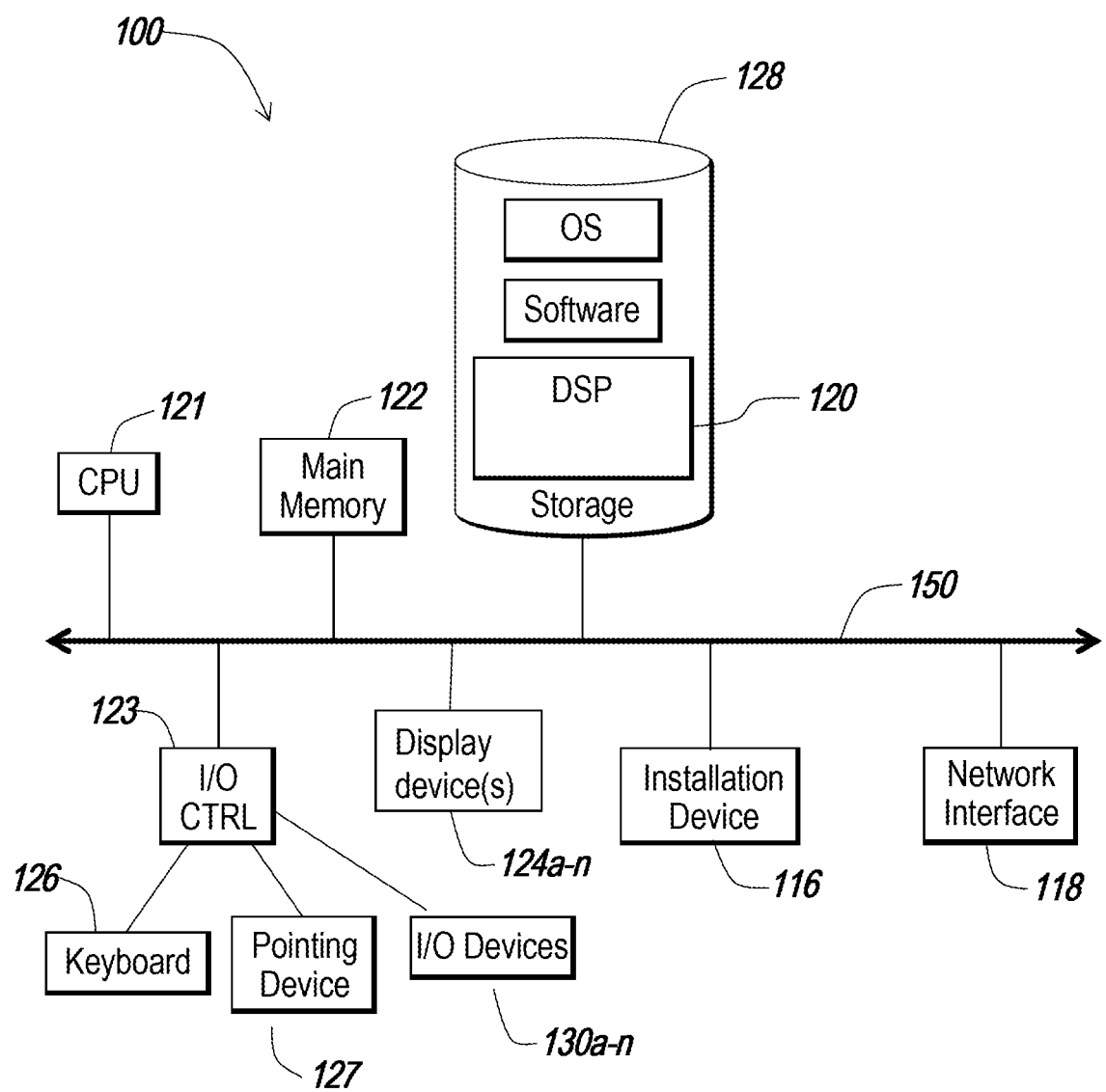
FIGS. 1B and 1C are block diagrams depicting embodiments of computing devices useful in connection with the methods and systems described herein.
Figure 1C:
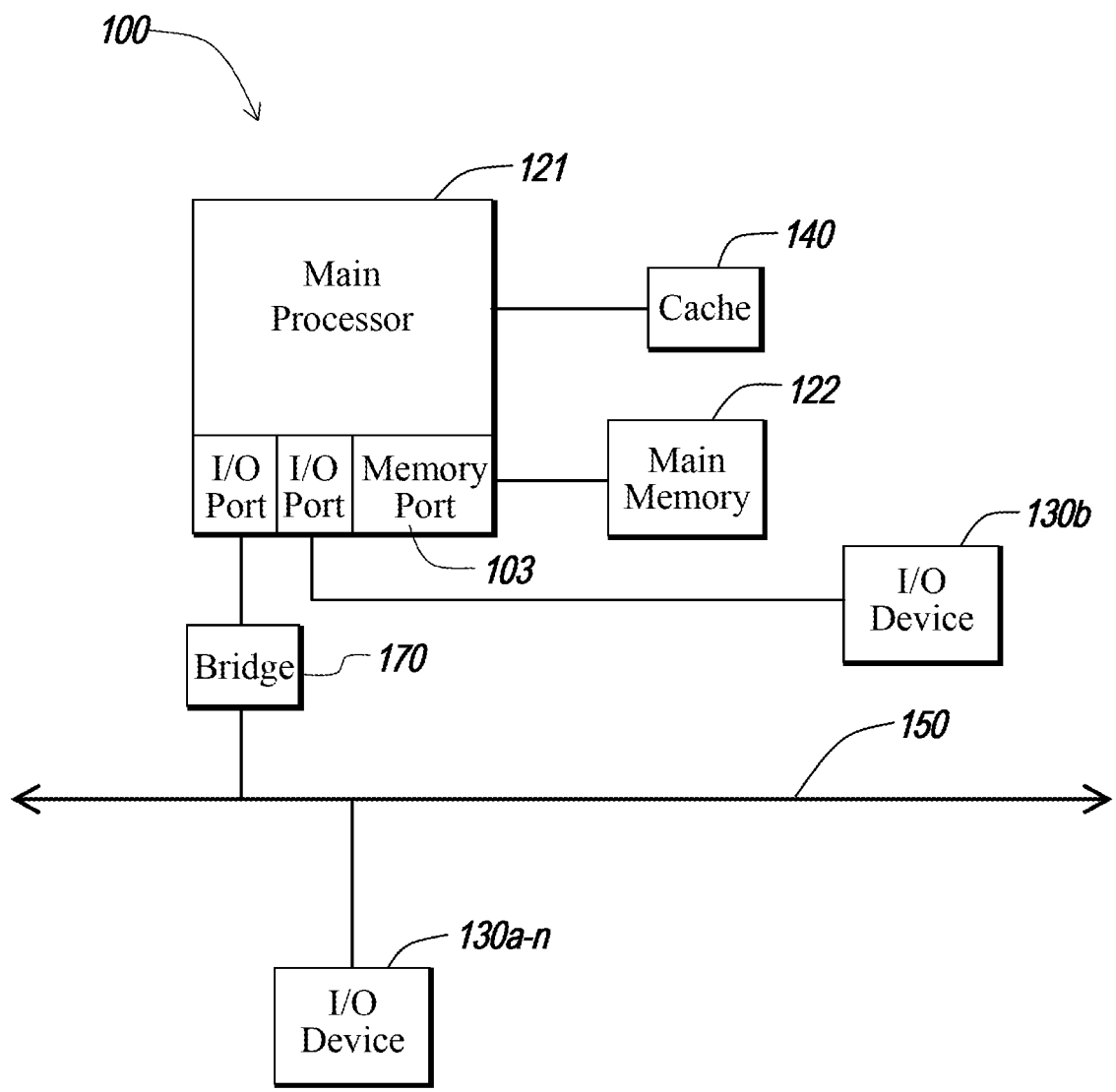

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system, software, and a software of a demand side platform 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124, FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for the demand side platform. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp, of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 players. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

In some embodiments, the status of one or more machines 101, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent n the context of the systems and methods disclosed herein.

B. Driving Demand for Services

Prior to examining specific embodiments of optimized online marketing and scheduling methods and systems that drive demand for services, it may be helpful to examine challenges that this disclosure can address. Typically, service providers who rely on appointments or reservations may struggle with openings in their calendar due to rescheduling, cancellations, no shows, as well as non-preferred time slots (e.g., perceived as inconvenient to potential customers). Calendar appointment booking capacity can be significantly impacted (e.g., by 20-50%) based on these factors. Current methods for handling these dynamic schedule changes may include contacting or reaching out to dormant clients, attempts to shift appointments around, or overbooking an appointment slot. In most cases, such actions continue to be a manual, tedious process (e.g., contacting clients by phone), and may risk alienating some customers (e.g., via overbooking or rescheduling). On the other hand, service providers may have a long wait list for the most convenient or desirable time slots, because of work, school, seasonal or other schedule-related factors that can cause demand to spike in these time slots. In certain cases, the service provider may accommodate urgent requests for these timeslots by utilizing a waiting list and using a manual process to manage any last-minute openings. Allowing customers to book an appointment far into the future may not always help. Rather, this has been shown to increase the likelihood of cancellations or reschedules, thus feeding into problems such as cancellations, no shows, etc.

The imbalance in demand for services can mean lost revenue opportunities for service providers of any kind, such as those for professional and technical services. Such services can include medical, dental, legal, financial and accounting services, including tax preparation. In addition, services can include that for HVAC, vehicle repair, electrical work, gardening or landscaping, workout/trainer/wellness sessions, beauty or cosmetic treatments or operations, massages or spa treatments, housekeeping, and baby/adult/dog-sitting, although not limited to these types of services or sessions. In some cases, service providers may have fixed pricing, or may offer general promotions (e.g., discounts, free services) and programs that are not focused on maximizing yields (e.g., revenues and appointments). For example, when a customer avails herself/himself of a discount through a general promotion, the customer may demand a prime slot which the provider could have filled with a full priced customer. Without tools to automatically manage and promote the supply and demand of (e.g., less preferred) appointments, service providers can suffer from open appointments in their schedules due to cancellations, no shows and such.

Customers or patients, on the other hand, may each have to wait weeks if not months to book an appointment at a time that is acceptable. A provider's customers are not always able to get appointments scheduled within a reasonable window to address their needs. Rather, their appointments may be scheduled many weeks Or months into the future. Customers can sign-up for standby or wait lists, but based on the manual actions of the provider's staff, may or may not be invited for an appointment. The present systems and methods can put that control in the customer's hands. Customers can have access to a provider's available appointments (e.g., in real time or near real time), whether or not the available appointment slots are convenient for them, and if any of these are convenient enough to book and/or attend because of the incentive offered only for those appointments.

Certain systems may access appointment information from provider offices and may publish those appointments online for example. These systems may not actively help market and till those appointments. That task is still usually done manually, e.g., by the service provider. In contrast, the present systems and methods disclosed herein can incentivize the provider's customer to actively look for openings and cancellations, and to book them when available. Embodiments of the present systems and methods can create supply and demand for available inventory (e.g., the appointment slots and service types). Both customers and providers can benefit from this solution. For example, customers can jump on an opening and be incentivized, and providers' appointments schedule can be filled up more efficiently and/or effectively to have fewer gaps. The system can actively manage this dynamic supply and demand to maximize yield by analyzing a variety of factors, including a provider's historical appointment data (e.g., cancellations by day, week, month, service, local events, etc), provider's historical user data (e.g., who pays on time, carries the best insurance plan to provide payment if needed, or has a lowest cancellation rate), and industry rules among other such factors.

In some embodiments, a system may provide or operate an appointment listing site, e.g., for appointments specific to certain providers. This system may list a provider's open appointments by day or time. Such a system may not be able to create demand from a customer to book an appointment to help to fill inventory in the service provider's schedule. In certain embodiments, a system may provide or operate an appointment marketplace. Such a system may list multiple providers' appointments on a website. The system may raise the same issues, and may add another layer/barrier in that a customer has to choose to go to a provider whom they may know nothing about, in some embodiments, a system may provide a deal site that may offer discounts on a service provider's services. These discounts may apply equally to open appointments in a provider's schedule. Such a solution may not be able to help fill open inventory, and may cause a loss of revenue due to lost fixed costs. Some services may offer discounts on service appointments, which may not be possible in the case of medical appointments, for example, since prices of such services may be set by insurance companies, industry rules/regulations, medical associations, etc. Often, providers may not like discounts on their services because discounts can devalue their service in the marketplace, causing a race to the bottom of the pricing market. Discounts can also erode prestige associated with the provider, and in some cases erode customer goodwill (e.g., from full-paying customers) leading to a reduction in revenues in the long term.

Various embodiments of the present systems and methods may incorporate an automatic appointment optimization solution that can maximize revenue utilizing incentives or premiums to capture new customers, re-activate dormant customers, and build loyalty with active customers. The present systems and methods can leverage incentives or loyalty points to drive demand for services or products. The methods disclosed herein can be used standalone with any integrated scheduling module or be layered or integrated to work with any other third party scheduling software (e.g., DemandForce, Dentrix, ZocDoc, etc.) or group discount website (e.g., Groupon, LivingSocial, etc). The present systems and methods can provide value and advantage to a provider by automatically trying to fill any openings in a provider's schedule, while giving the provider's customer an opportunity to jump on a last minute appointment, and possibly be incentivized to do so.

The system, sometimes referred to as an appointment platform, service or engine, can include various capabilities to achieve this, including but not limited to the following. The appointment platform may be configured to require minimal or no manual intervention to fill open inventory. Appointment openings in a service providers schedule can be automatically linked or transmitted to the appointment platform. Some embodiments of the appointment platform can analyze what type of incentive, as well as the level or value of incentive to offer for a specific type of service, rank users (e.g., waitlisted and/or new users) and inform certain users of service availability. The appointment platform can create demand for non-preferred appointment times in a service provider's schedule. For example, Wednesday at 3:00 p.m. may always be available, but due to an incentive being offered through the appointment platform, demand may be created for this non-preferred time slot by incentivizing a user to act on it. Customers or users looking for an appointment within an immediate timeframe (e.g., today) with their preferred provider are able to watch for openings and jump on such appointments immediately as soon as they open up. Certain preferred users or customers may be incentivized differently or more to take up an open appointment slot, or to reschedule from their existing slot.

Figure 2A:
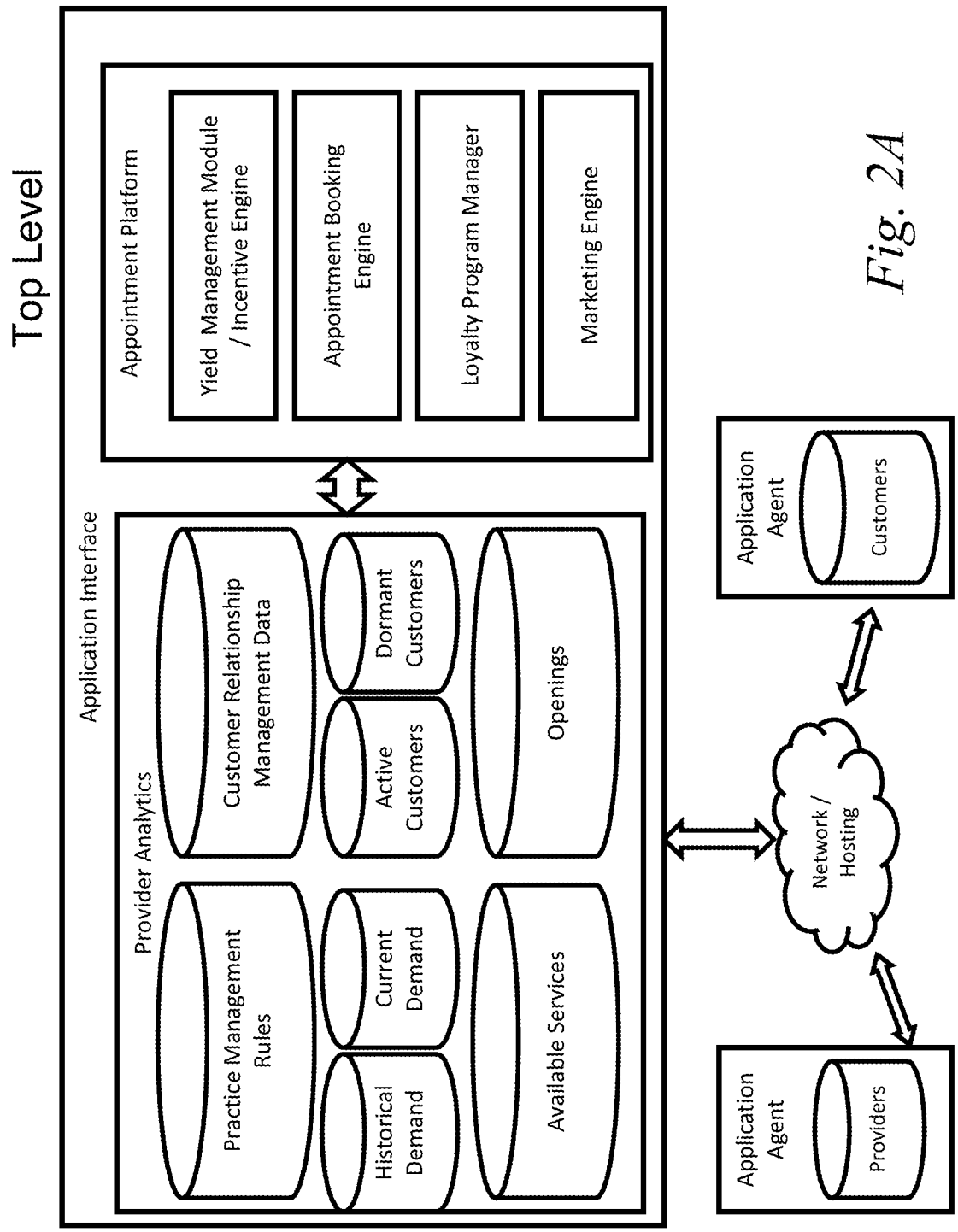
FIG. 2A is a block diagram depicting an embodiment of an optimized online marketing and scheduling system based on driving demand for services.

Referring to FIG. 2A, one embodiment of an optimized online marketing and scheduling system based on driving demand for services is depicted. In brief overview, the system may include an appointment platform and an application interface. The application interface may provide direct and/or network-based interface or access to data such as analytics, provider inventory, and user information (e.g., user schedule, demographic and/or location). The system may sometimes be referred to as the appointment platform, which may incorporate the application interface as well as any corresponding physical/network/database interfaces. The system may operate on hardware including one or more servers or computing devices, and may include storage modules for holding data, such as those described above in connection with FIGS. 1A-1C.

In accordance with certain embodiments of the system, the appointment platform may bring efficiency and maximize yields through incorporation and/or use of one or more intelligent demand-and-yield-based management modules. For example, the system may include one or more modules working together and/or independently to perform various functions, data analytics and manipulation. The system may be configured or offered as, but not limited to, a hosted online solution (e.g., web service or SaaS), either based on a cloud environment or self-hosted servers. This architecture can allow for the dynamic scaling, distribution and/or load-balancing of the system to handle increased user activity load at any time without causing interruptions in service.

In some embodiments, the system can utilize data from multiple sources to efficiently optimize customer demand, provider inventory take-up and/or user experience. The system may collect, request for, or otherwise access, via its interfaces, open appointment inventory from one or more providers. Open appointment inventory may sometimes be referred to as openings, appointments, slots, or open/available appointments/slots. The system may access or collect the inventory data in real-time or based on a delayed schedule (e.g., daily or some other predefined schedule, or responsive to specific trigger events or metrics such as a detected change in a provider's schedule) using multiple methods to collect this data (e.g., shared access, authenticated access, database synchronization messages or instructions, etc). In some embodiments, the system may provide and/or communicate with application agents, which may reside at a provider/user/customer's system (e.g., a server or computing device hosting or providing access to an appointment database, schedule, etc).

The system may access information or analytics such as historical demand for services and appointment slots, current or updated demand for these, active or dormant customers of the provider, including new customers, and available types of services offered by the provider, each of which may include a corresponding service duration, and availability of facilities/equipment/personnel, for matching with an appointment time slot. The system may access, collect and/or analyze historical appointment utilization data from each provider or certain providers. The system may access, collect and/or analyze historical customer appointment and billing data to determine how customers may rank with regards to, for example, appointment attendance, insurance or other payment method, and on-time payments, punctuality, among other factors.

The appointment platform may be configured to receive and/or adhere to practice management rules and guidelines, which may be related to a provider's in-office rules, industry rules or guidelines, and service network membership rules or guidelines, and/or specific to the rules of an insurance company or other partner entity, for example.

Referring again to FIG. 2A, the appointment platform may include a yield management module or incentive engine. The incentive engine may determine or generate customer-specific incentives e.g., types and/or levels of incentive) and loyalty rewards based on any of the above analytics. The incentive engine may interoperate with a loyalty program manager to access, update and/or manage loyalty rewards. In some embodiments, the loyalty program manager determines, generates, assigns and/or maintains loyalty rewards for a customer, and may provide any of this information to the incentive engine (e.g., to determine a user-specific incentive) and/or appointment engine (e.g., to rank a user). The appointment platform may, in some embodiments, include a marketing module. The marketing module may implement processes for marketing open inventory and associated incentives/rewards to current/dormant/new customers. Marketing may, for example, be done through online portal(s), apps on mobile devices, add-ons for desktop applications, etc. The above modules of the appointment platform may automate all or some of the above processes among others so as to bring optimization across various processes, some of which may be too challenging or performed manually or inefficiently in the past.

Figure 2B:
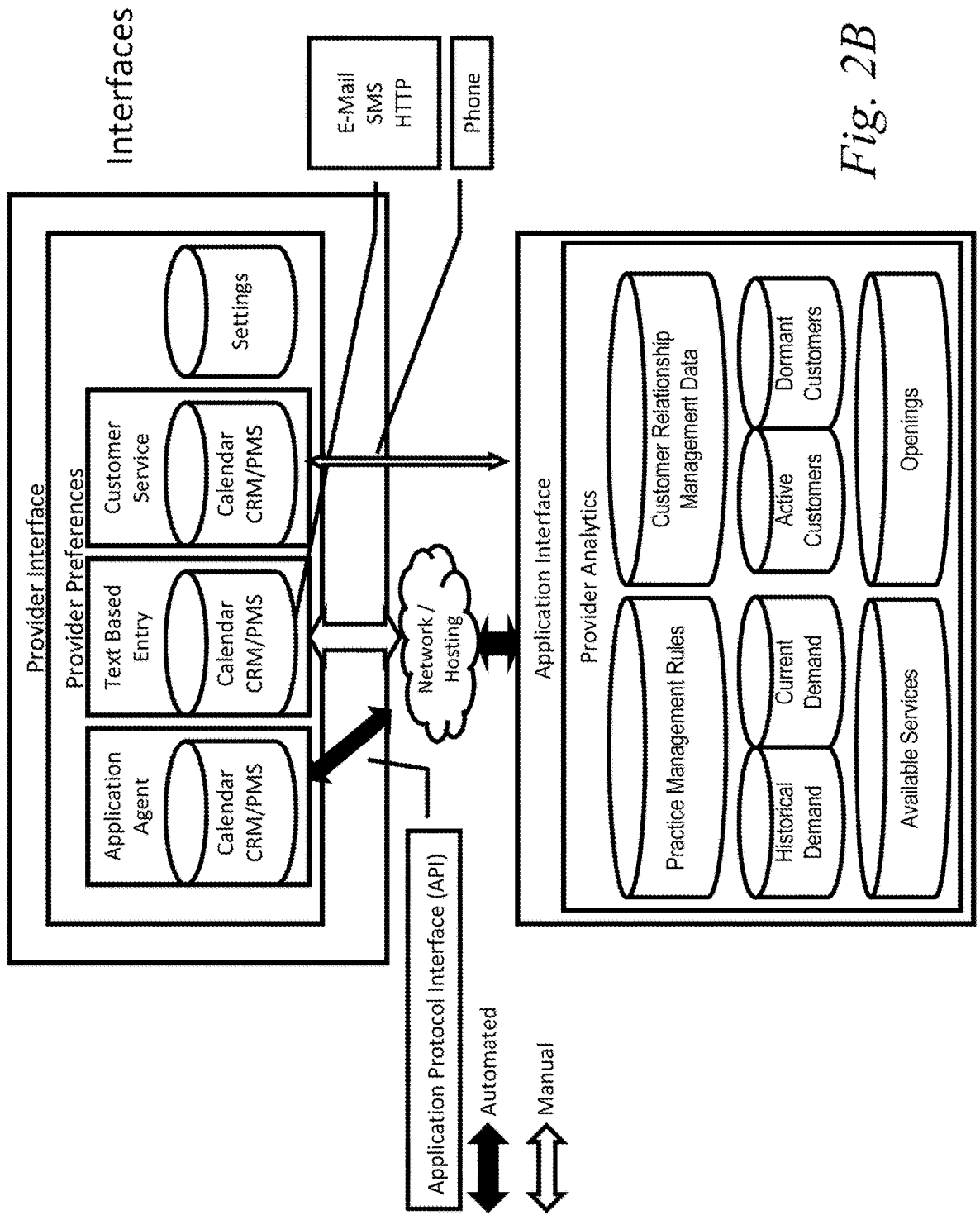
FIG. 2B is a block diagram depicting an embodiment of data collection interfaces of an optimized online marketing and scheduling system.

Referring now to FIG. 2B, one embodiment of the data collection interfaces of an optimized online marketing and scheduling system is depicted. In terms of data collection or access, one of most basic underlying data the system may need from a provider is the provider's current open inventory of appointments. The system and/or the provider may provide one or more interfaces for accessing the inventory and/or provider preferences. For example, FIG. 2B shows embodiments where an application agent may provide automated access, a text-based entry interface where a provider may manually input, send or upload information for access, and/or a customer service option in which a customer service representative or operator may interface with the provider via phone or live-chat for example, to update information. Based on the inventory and/or preference data, and in certain embodiments based on additional rules (e.g., pertaining to incentive limits, time of day, weather, etc) and/or other analysis of business data, the system can market these openings optimally to potential appointment takers.

The current inventory of appointments can be input into our system using numerous methods. For example, and in further details, such methods may include operator assisted check-ins with the provider at specific times in the day, and the provider may phone, email or use a web-interface to contact an operator to provide inventory updates. In some embodiments, automated software agents may be provided and installed on a provider's server(s). Such software agents may intercept, detect or access inventory updates within the provider's system, and may provide a secure, authenticated and/or encrypted communications link or session with the application platform. In certain embodiments, web-based entry of openings may be performed by providers, their staff, or operators supporting the application platform, etc. Certain embodiments of the system have the capability to interface and work with a provider's current booking/appointment system, and/or integrate with any $3^{rd}$-party add-on the providers may use for this business process (e.g., Demand-Force, etc). The system may employ the additional data, collected via the automated software agents for example, in determining various incentive, user-ranking and/or marketing strategies, for example.

Data accessed by the system via any of the interface embodiments may include, but not be limited to historical appointment data to measure past performance, provide projections, or to identify booking/cancellation trends, for example, to identify (a) types of services that had the least and/or most cancellations in the past, (b) effect of (e.g., good/bad) weather on appointment cancellations, attendance or punctuality, (c) success (e.g., of in-house staff or a marketing channel) in filing an opening, (d) lost appointment inventory, etc. The data accessed may include historical and current customer data to measure characteristic or attributes such as (a) which customers have overdue services which are pending, (b) customers who pay on time or pay late, (c) customers who cancel appointments at the last minute, (d) the modes of payment a customer may rely on (e.g., check, cash, credit card, PayPal), etc. The data accessed may sometimes include insurance rules, e.g., (a) which insurance companies pay on time, (b) the payment rate, or the percentage of payment per service to the provider, (c) the annual payment or coverage limit of an insurance provider, (d) co-pay requirements of an insurance carrier, etc.

In some embodiments, the system may factor in additional data from other sources such as (a) weather at a providers location to predict possible cancellations, (b) any events in the providers general area or locality which may arise delays or cancellations or demand, (c) the number of people or requests for appointments at a providers website, (d) the number of phone calls the providers office is receiving, etc. The system can utilize all or some of this data and/or analytics, as disclosed herein, to figure out an optimal approach to marketing an open appointment, with the goal that that an open appointment should not go wasted, hence reducing costs and generating additional revenue for the provider.

Figure 2C:
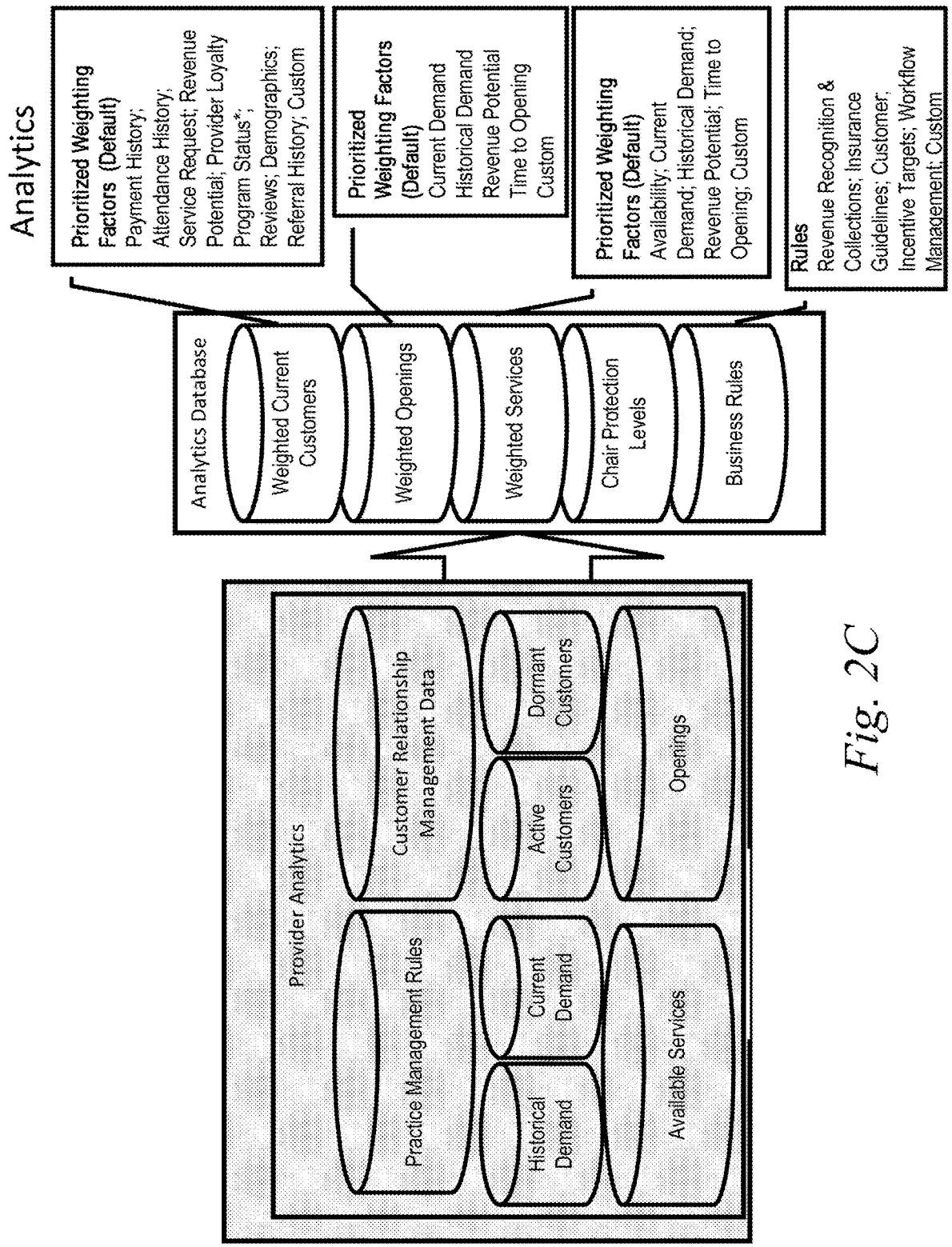
FIG. 2C is a block diagram depicting an embodiment of an analytics module of an optimized online marketing and scheduling system.

Referring now to FIG. 2C, one embodiment of an analytics module of an optimized online marketing and scheduling system is depicted. In certain embodiments, the analytics module is a core module of the appointment platform, and may include an appointment engine and/or an incentive engine. The analytics module may include an analysis engine, or may sometimes be referred to as the analysis engine. The analytics module may consider numerous factors to determine an optimal way to market available appointments to customers. The analytics module may be customizable to incorporate additional factors or a different combination of factors, at any time, and may do so on a provider-to-provider and/or a service-type-by-service-type basis. The analytics module may consider one or more of these categories of factors, though not limited to the following: (1) Appointments, (2) Customers, (3) Services, (4) Rules, (5) Incentives, (6) External, and (7) Industry Rules/Rates, at least some of which have been described earlier. Some of these factors may be designated top-level factors, and may have more specific weighted sub-factors which can allow detailed assessment or quantification of various characteristics.

In particular, for Appointments-based factor(s), the analytics module may analyze a provider's historical data to give insight into different characteristics of how their service appointments are handled. For example, the analysis engine can look at data for the month of July over the last five years and determine that appointments of service A are not in-demand (e.g., this may be due to warm weather in the summer during which customers may not want to make office visits). Recognizing this characteristic, the analysis engine can predict that there might be numerous opening of service A and as a result the incentives offered may have to be of a type or level that is more attractive to a potential customer.

The analysis engine may rank or weight each opening, relative to any set of openings. The analysis engine may rank or weight each opening based on, for example, current demand for an opening, historical demand, revenue potential from the opening, remaining time to the opening, and/or any custom rules. The analysis engine may perform the ranking using prioritized weighting on one or more factors. In some embodiments, a default set of factors, and a default set of weights corresponding to certain factors, may be incorporated in the ranking.

With regards to Customers-based factors, the analysis engine may be able to measure or determine many characteristics of users, including a provider's current customers. For example, the analysis engine may look at customer A and customer B, and their past appointment attendance, and recognize that customer A tends to cancel his/her appointments at the last minute (e.g., more so than customer B). Understanding or recognizing that this behavior may not beneficial to the provider and/or other customers, the incentive offered to customer A on a particular opening may be less or of a different type than that offered to customer B. In some embodiments, the selection of incentives may provide a preference to customer B over customer A. In other embodiments, the selection of incentives may influence the behavior of customer A, so that he/she is less likely to cancel the appointment.

The analysis engine may rank users, including active or dormant customers, as well as new users or potential customers. The ranking may be performed based on factors such as payment history, attendance history, service request history, revenue potential of a user, insurance provider, provider or appointment platform loyalty program status, reviews of services deriving from a user, demographics of users, referral history, and other custom rules and factors. The analysis engine may perform a ranking using a prioritized weighting on one or more factors. In some embodiments, a default set of factors, and/or a default set of weights corresponding to certain factors, may be incorporated in the ranking.

With regards to Services-based factors, providers may offer numerous types of service appointments. Based on this and other data, the analysis engine may be able to determine that Service A is more in-demand vs. Service B. The analysis engine may decide, based on the determination, not to incentivize too heavily on Service A.

The analysis engine may rank or weight each service, relative to any set of services. The analysis engine may rank or weight each service based on, for example, current demand for an service, historical demand, revenue potential from the service, remaining time to the service opening, and/or any custom rules. The analysis engine may perform the ranking using prioritized weighting on one or more factors. In some embodiments, a default set of factors, and a default set of weights corresponding to certain factors, may be incorporated in the ranking.

With regards to Rules-based factors, the analysis engine may incorporate any number of custom, industry and/or provider rules to rank, weight or prioritize users, openings, services and/or incentives. For example, the analysis engine may apply rules pertaining to revenue recognition and/or collections, insurance guidelines, customer selection or preference, incentive targets, and workflow management. For example, where a provider's office accepts different types of insurance, the analysis engine may be able to determine that customer B has a better insurance plan vs. customer A based on payment ratio, payment limits and reimbursement timelines. The analysis engine may decide, based on the determination, that certain types and/or levels of incentives (e.g., better incentives) should be offered to customer B. Other rules may direct or influence the analysis engine to consider if a customer can book an appointment for a service which is covered by insurance if rendered only at X interval (once in 6 months, etc.)

With regards to Incentives-based factor(s), based on incentive limits (if any) set by providers for their service offerings, the analysis engine may be able to determine which type and/or level of incentive to help fill specific service appointments. The analysis engine may increase, decrease, or promote certain types of incentives based on any one or a combination of the time of day, weather, location of user accessing the openings, etc. Thus, the analysis engine can provide (e.g., via the incentive engine) the capability of performing dynamic incentive modeling to help entice users to book an appointment.

With regards to External-based factor(s), such factors can include, but is not limited to (a) the time remaining to an appointment, (b) proximity of a user, e.g., one searching for available appointments to a provider, (c) local weather conditions, and (d) events that may take place locally, e.g., proximate to the appointment. These factors can help weigh the cost value of an appointment, and allow incentives to be decided appropriately by the analysis engine (e.g., via the incentive engine), so as to result in the filling of the appointment.

With regards to factors pertaining to Industry Rules/Rates, certain embodiment of the analysis engine can be configured or designed to track industry specific rules and rates of appointment filling, no-shows, cancellations, and may factor all or some of these into analytics for appointments, user-ranking, marketing and/or incentives.

Figure 2D:
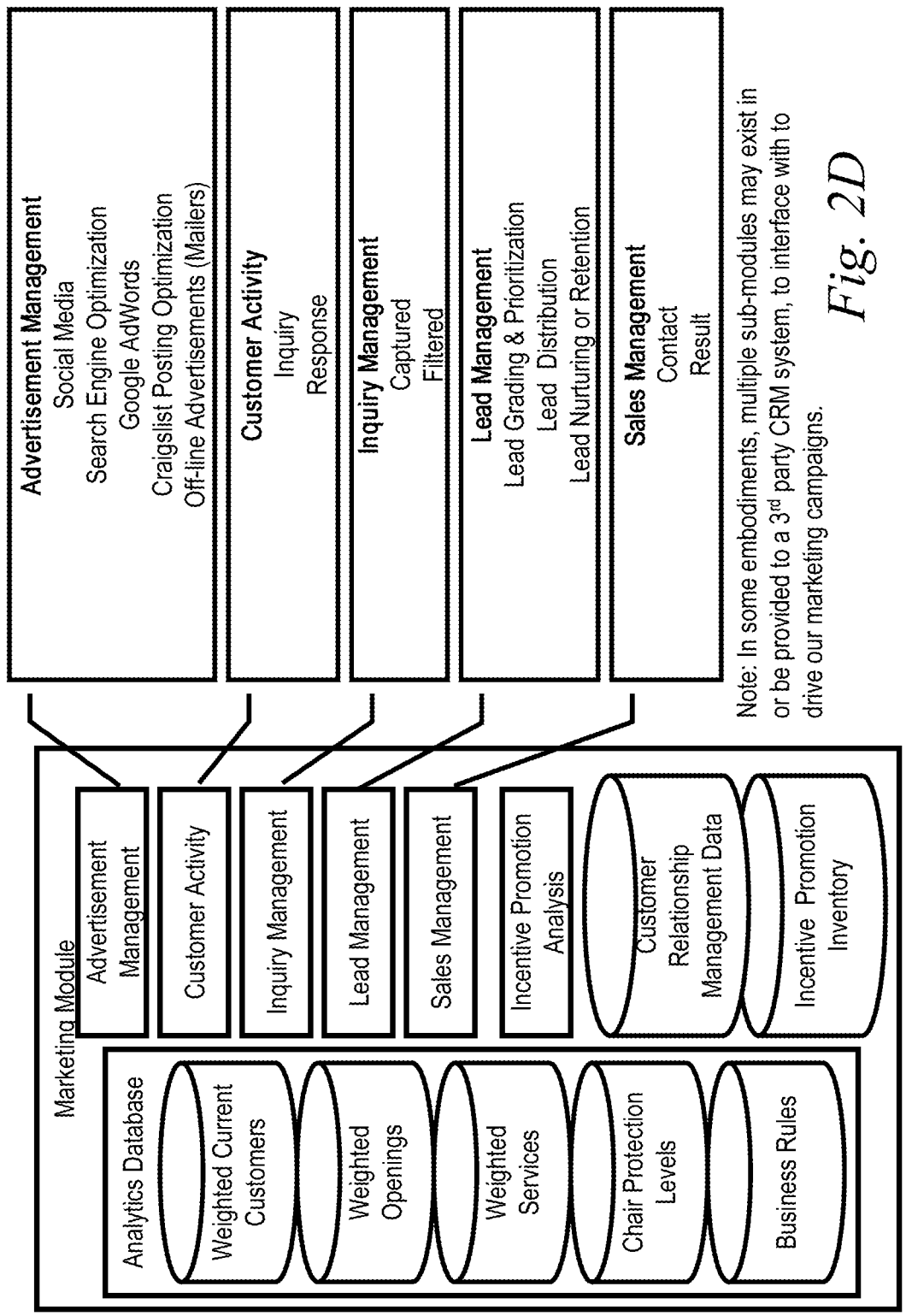
FIG. 2D is a block diagram depicting an embodiment of a marketing module of an optimized online marketing and scheduling system.

Referring now to FIG. 2D, one embodiment of a marketing module of an optimized online marketing and scheduling system is depicted. The marketing module can automate many of the processes involved to connect users with their existing providers and/or potential providers in our system. The marketing module can include various sub-components, including some or all of, but not limited to modules for: (a) Advertisement Management, (b) Customer Activity, (c) Inquiry Management, (d) Lead Management, and (e) Sales Management.

The marketing module may incorporate an Advertisement Management module. Based on various business and/or pricing rules per service provider, or per service type, the advertisement management module can auto-market a provider's openings and incentives via internal and/or external mediums. For example, the system may post openings on external market sites such as Craigslist or on social media sites, which may be provided by the appointment platform or a third party. If a provider's budget allows, this module can submit or rotate banner advertisements on partner websites. The advertisement management module can automatically inform patients on a standby basis (e.g., on an email list) of openings. The advertisement management module may initiate Robo-calls or text message alerts to select users. This module may perform any of these processes automatically and/or may trigger the appointment platform's support team, or the providers support team, to complete certain required actions.

The marketing module may incorporate a Customer Activity module. The customer activity module can track any user service requests and process as required. For example, if a user requests a Service A at a provider's microsite and that provider offers the service, the customer activity module may allow the user to proceed to the appointment booking process. But if a user requests a different service on the appointment platform website or on a provider's microsite, and the provider does not offer that particular service, the customer activity module may try to connect them with other providers in our system who offer the requested type of service.

The marketing module may incorporate an Inquiry Management module. There may be occurrences in which the appointment platform receives user requests for services which are not offered by providers already in the system. In such cases, the inquiry management module can consolidate such requests appropriately so that the appointment platform's sales team can approach other providers who offer these types of services.

The marketing module may incorporate a Lead Management module. Leads coming in through multiple marketing channels can be managed within the lead management module. The lead management module can handle revenue sharing or process lead fees to properly calculate the incentives paid as well as to maintain profit margins for the appointment platform. This can apply to both service provider leads as well as customer leads. The lead management module may also extend into the appointment platform's incentive program (e.g., via the incentive engine and/or loyalty program manager), and can track the success of each channel or partnership.

The marketing module may incorporate a Sales Management module. When a lead expresses interest in working with or registering with the appointment platform, whether it be a service provider or a customer in booking an appointment, the sales management module can enable the platform to market additional opportunities to both sides, so as to increase revenue potential. The sales management module can track each provider's sales statistics to help measure the success of the appointment platform, e.g., in reducing appointments inventory, or realizing increased sales and/or client base. The sales management module can also keep track of money spent by a consumer so that the loyalty program manager can translate these into rewards in the appointment platform's loyalty program.

In certain embodiments, the marketing module may include a paid-ad module. The paid-ad module may produce and/or place ads on behalf of advertisers. These ads may be related to services and/or providers available via the appointment platform. The appointment platform may allow advertisers (e.g., providers, product manufacturers, etc) to place ads through the appointment platform (e.g., on a provider's microsite, or the appointment platform's newsletters, text alerts, etc.)

In a typical offer to a user, the appointment module may be configured to be neutral to any particular service available for an open appointment. In some embodiments, the appointment platform may make available to a provider an option to promote particular service(s), such as a premium service as compared to a normal or low-profit-margin service. For example, the incentive platform may offer better incentives if a user books an appointment for a preferred service. The marketing module may promote or advertise a preferred service available through a provider when offering a user the opportunity to book an open appointment with that provider.

In some embodiments, the marketing module may market content, openings, services, providers, etc, on any advertising or marketing channels (e.g., social media or other sites) on behalf of a provider or a group of providers, and optionally association of their services with the appointment platform. Such marketing efforts may increase the provider's and/or the appointment platform's market presence and/or credibility. In certain embodiments, the system may incentivize users to refer other friends and family members to a provider. For example, a user who makes a referral or connection may receive an incentive, and the referral that signs-up with the appointment platform or books an appointment may get an incentive. In some embodiments, the appointment platform may incentivize users or providers to refer other service providers to join or partner with the appointment platform.

Figure 2E:
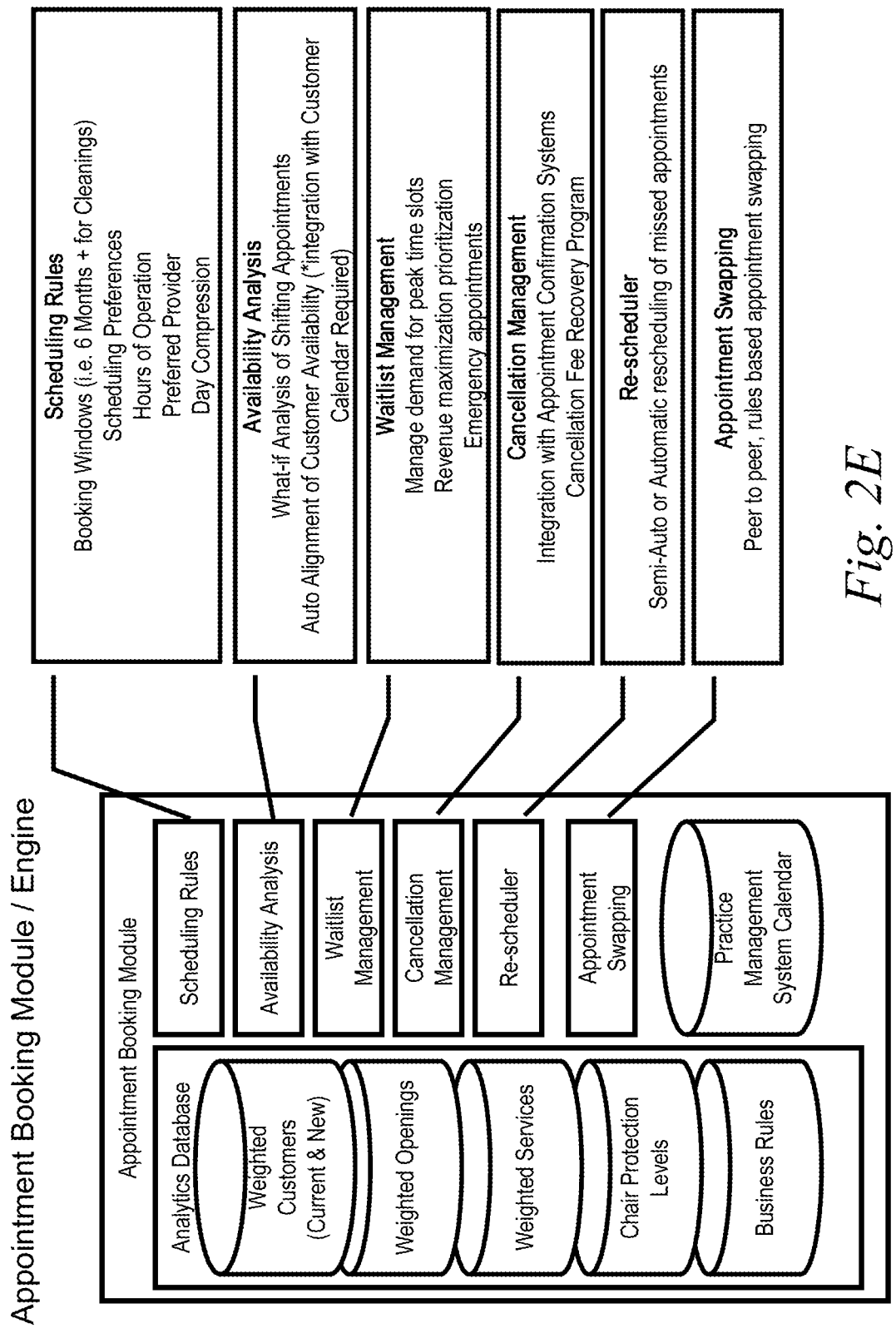
FIG. 2E is a block diagram depicting an embodiment of an appointment engine or appointment booking module of an optimized online marketing and scheduling system.

Referring now to FIG. 2E, one embodiment of an appointment engine or appointment booking module of an optimized online marketing and scheduling system is depicted. In some embodiments, the appointment booking module provides an interface for users and providers to access services provided by the appointment platform's analytics and yield optimization processes. The appointment booking module can allow users to perform various appointment booking, cancelling, re-scheduling actions. The appointment booking module may allow providers to effectively view and manage processes such as waitlist, cancellation history, trends, and appointment re-scheduling benefits among other such actions. The appointment engine may provide some of the functionalities of the analysis engine or other modules of the appointment platform, for example, identifying open appointments to be filled, ranking users (e.g., to which an open appointment may be offered), ranking open appointments, ranking services, and determining which user(s) to offer an open appointment.

In some embodiments, the appointment engine includes an Appointment Management module. Users may view appointment inventory online and can book an appointment, cancel or re-schedule an existing appointment through an interface provided by the appointment management module. The appointment management module may send reminders via email, phone, text message, etc, to a user based on set time intervals to make sure that an appointment is not cancelled/re-scheduled at the last minute. The system may also verify the validity of appointment requests based on provider, industry, insurance rules. For example, if a provider does not allow cancellations of an appointment within 24 hours of the appointment, the appointment management module may block such an action by a user and/or the provider's staff. In another example, if insurance company A only allows service B to be performed once every 6 months, the appointment management module may prompt a user to select a different or appropriate appointment based on this rule.

In some embodiments, the appointment engine includes a Cancellation Incentives module. If a provider enables an option to provide cancellation incentives, the cancellation incentives module can incentivize users to cancel their appointments ahead of time. The incentive may automatically vary based on the time available to fill that appointment and will decrease as the time availability reduces. The incentive may be paid out if the appointment platform is able to fill the appointment with another user. Incentivizing users for this can allow a provider to proactively manage possible last minute cancellations and increase yield. This feature may automatically verify such cancellations based on system/provider rules, for example, no more than one incentivized cancellation in a three month period may be allowed.

In some embodiments, the appointment engine includes a Waitlist module. Users may be able to request openings based on a specific service or day of week or time of day via the waitlist module. If an appointment opens up, the waitlist module can automatically rank or weigh the quality of waitlisted users, and can contact the top weighted user(s) to determine if they are interested in that available appointment. If the appointment is accepted by a user on the waitlist, no further waitlist notifications may be carried out. The system may provide an interface or messaging system that dynamically updates the status of the open appointment, e.g., whether the appointment is still available, and if the incentive for filling the appointment has changed, so that a user may choose to take action or not.

In some embodiments, the appointment engine includes a Swapping module. The swapping module can allow users to swap their appointments with other users who have appointments with the same provider. This may be an optional feature and may be enabled on a per-provider and/or per-service basis. Users may be able to swap their appointments for compensation or incentives in the form of points, cash, gift, etc. For example, the cancellation incentives module can incentivize a user to give up an appointment and/or reschedule. A customer may seek a particular appointment slot and may utilize part of the customer's accrued loyalty rewards, membership score and/or incentives to translate into an incentive for another user to vacate the particular appointment. The cancellation incentives module and/or the swapping module may broker the offer between the users. A user may however, setup a preference via the appointment platform to not receive such offers. In some embodiments of the system, if a user notices that there is someone on the waitlist looking for a 8:00 a.m. Monday appointment, the user can send the waitlisted person an offer to swap or release the appointment for 50 points in the system. If the waitlisted user agrees, the transaction can be completed by the swapping module upon possible confirmation from the provider and verification of swap rules (e.g., a limit of one appointment swap per a three-month period, etc).

In some embodiments, the appointment engine includes a Schedule Matching module. The schedule matching module can provide and/or interact with various smart phone, desktop or other device software add-ons, which can integrate with a user's schedule and his/her selected providers in the system. For example, after a user installs a desktop add-on onto the user's scheduling software (such as Outlook), the user can configure or set the plug-in to notify the user if a particular provider (e.g., dentist or mechanic) in the system has any openings for a specific service, that match an opening in the user's schedule. This way, a user can quickly and automatically be notified of an open appointment and possibly an accompanying incentive.

In some embodiments, the appointment engine includes an Inventory Alerts module. Users may be able to setup various alerts via the inventory alerts module by a schedule of their choice. For example, a user can instruct or request the system to send the user an email each day of all openings and last minute incentives being offered by their chosen providers in the system for the coming week. That way, a user can immediately decide to take an opening identified in an alert if it suits the user's need.

Figure 2F:
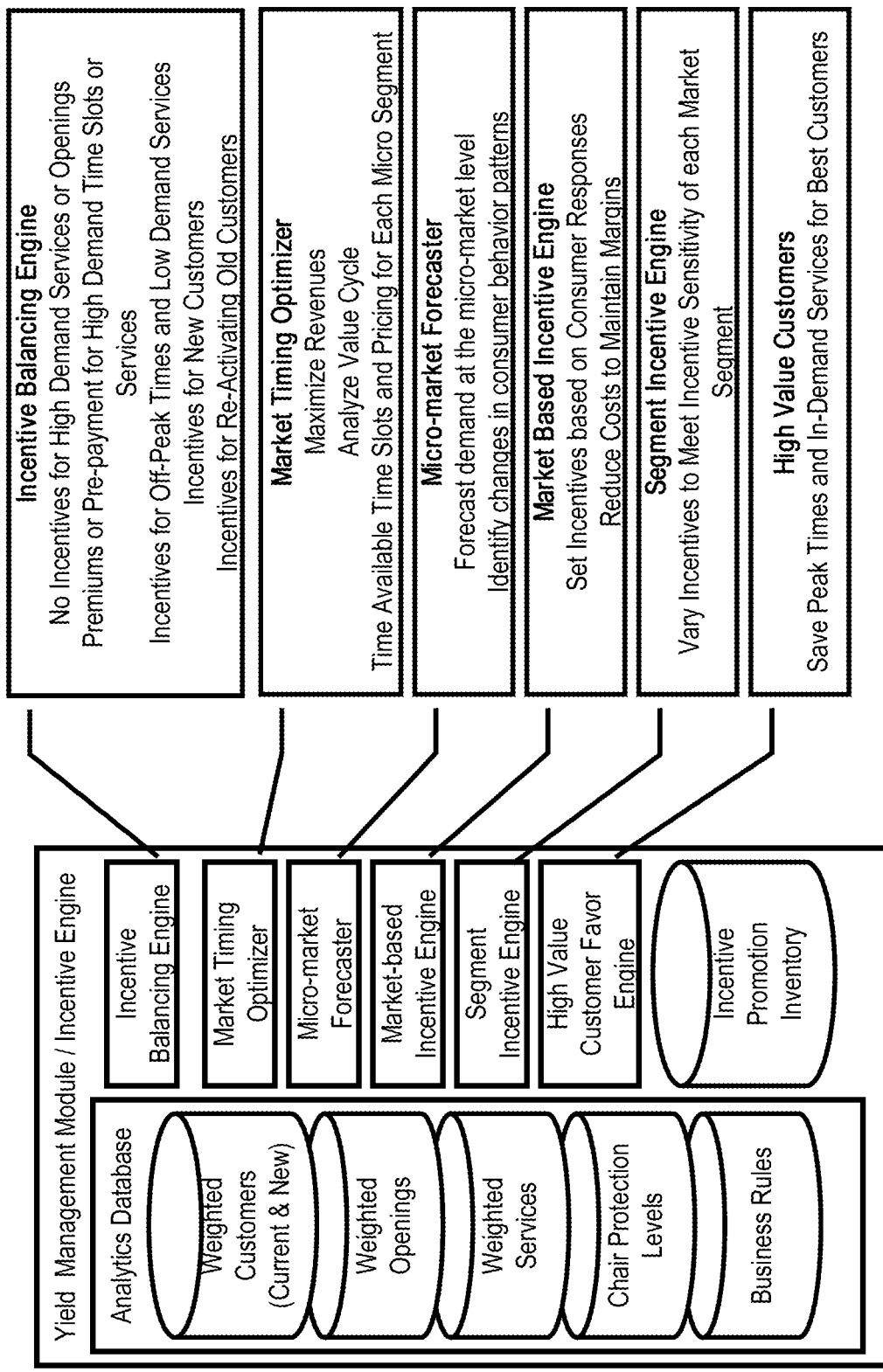
FIG. 2F is a block diagram depicting an embodiment of an incentive engine or yield management module of an optimized online marketing and scheduling system.

Referring now to FIG. 2F, one embodiment of an incentive engine or yield management module of an optimized online marketing and scheduling system is depicted. This module may interoperate with, and in some embodiments, rely substantially on the analytics module or appointment engine to optimize collected data into high yields. One function of this module is to ensure that any available appointment inventory in the system is properly weighted, incentivized and/or available for advertisement. The incentive engine may interface with the analytics module or appointment engine to receive and/or validate ranking information for users, openings and/or services. The incentive engine may determine, based on the ranking, a type of incentive from a plurality of types of incentives, to offer to a particular user for filling an open appointment.

The incentive engine may include an incentive balancing engine. The incentive balancing engine may balance demand with the type and/or level of incentives that may be offered, to determine the incentive, if any. For example, the incentive balancing engine may offer no incentives for high demand services or openings. The incentive balancing engine may determine that premiums or pre-payment may be justified for high demand time slots or services. The incentive balancing engine may determine appropriate incentives for off-peak times and low demand services. The incentive balancing engine may determine appropriate incentives for new customers, e.g., to encourage activity from such customers. The incentive balancing engine may determine incentives for re-activating old, dormant or former customers.

The incentive engine may include a market timing optimizer, that operates to maximize revenues, analyze value cycles, time available time slots (e.g., to offer to users), and provide pricing for each micro segment, for example. The incentive engine may include a micro-market forecaster, which operates to forecast demand at the micro-market level, and identify changes in consumer behavior patterns, for example. The incentive engine may include a market-based incentive engine, which may set incentives based on consumer responses (e.g., the amount of response received for a similar appointment opening, or the number of waitlisted users), and may operate to reduce costs, where identifiable, to maintain margins for a provider and/or the appointment platform. The incentive engine may include a segment incentive engine, which may determine and vary incentives to meet incentive sensitivity of each market segment. In certain embodiments, the incentive engine may identify and save certain peak times and in-demand services for high-value or preferred customers or users.

In some embodiments, the incentive engine may determine incentives based on cross promotion of providers and incentives. The incentive engine may, for example, interoperate with the marketing module to implement or manage cross promotional efforts. The incentive engine may offer a user access (e.g., a free or discounted service voucher) to a second provider's service as an incentive for booking an open appointment with a first provider. For example, the appointment platform may determine that the second provider has an open slot to be filled, and may leverage on that open slot as an incentive to the user to book a different appointment. By way of illustration, the appointment platform may cross promote two providers, a dentist and a massage therapist. The appointment platform may determine that the massage therapist has an open appointment, and can intelligently offer that appointment as an incentive, to the dentist's customers, to book an open appointment of the dentist. Such cross promotional or cross marketing efforts can yield a number of benefits, e.g., simultaneously filling two (or more) open appointments (e.g., with two different providers), increasing the providers' and/or the appointment platform's overall yield and revenue, and expanding an existing customer base to another provider or service.

In some embodiments, the incentive engine may offer incentives based on tie-ups with manufacturers or suppliers of products related to a provider's services. For example, the incentive engine may offer a free electric toothbrush (which may be sponsored by Oral-B, for example) as an incentive for a user to book an open appointment with a dentist. The appointment platform may help to promote the product (e.g., electric toothbrush) on behalf of the manufacturers or suppliers, by offering the product as an incentive. In some embodiments, the appointment platform may partner with, and may be incentivized by, the manufacturers or suppliers in offering the product as an incentive. The providers may or may not have to endorse the sponsored incentives for filling the providers' appointment slots. In some cases, this may be viewed as cross promotion or marketing across sponsors and service providers.

Figure 2G:
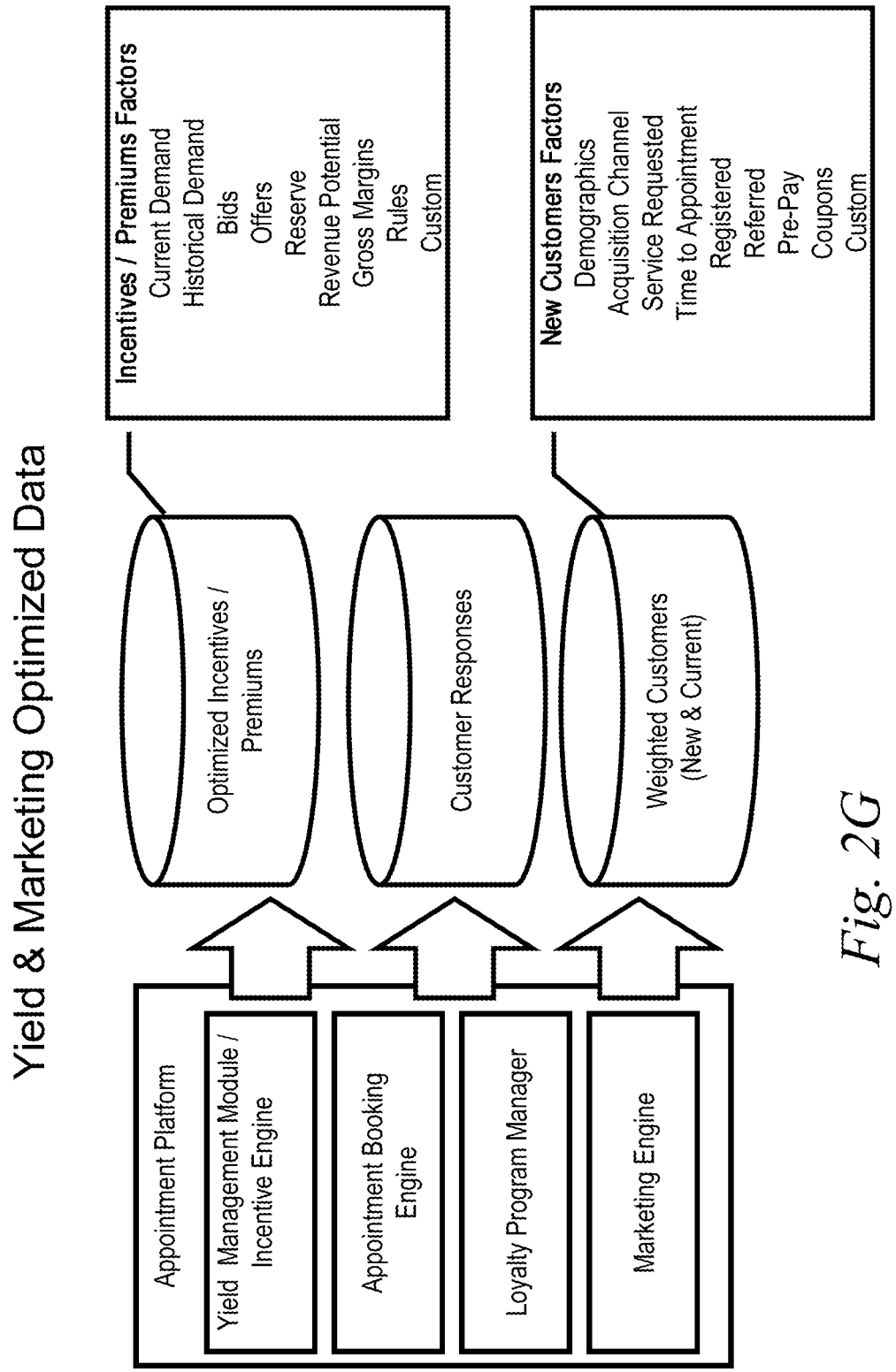
FIG. 2G is a diagram depicting an embodiment of a system and method for providing yield and marketing optimized data.

Referring now to FIG. 2G, one embodiment of a system and method for providing yield and marketing optimized data is depicted. The system may generate optimized incentives or premiums for opening, services and/or users. The yield management module, based on multiple weighted factors (for example, factors listed in FIG. 2G), can produce an intermediate optimized set of incentives and/or premiums at a global level. The optimized incentives and premiums can be generated dynamically based on predetermined factors such as fluctuations in inventory or demand. The system may collect, process and aggregate customer responses into response data. This response data may reflect or capture the user response to the incentives (e.g., how many people viewed a particular incentive or clicked on it for further details, etc). This response data may allow the yield management module to batter predict future incentives to target to consumers.

In certain embodiments, the system may produce a database or list of weighted customers. This data (e.g., generated from the marketing engine) may represent a weighted list based on any of the one or more factors discussed (for example, factors listed in FIG. 2G). Service providers may want to configure the appointment platform to stack new users at the top of the list over current customers, and may determine preferred customer(s) to maximize the providers' returns. For example, long term loyal customers may supersede a new customer in an attempt to maintain a relationship. These factors may play into the weighted list when incentives are being offered to each individual on the list.

Figure 2H:
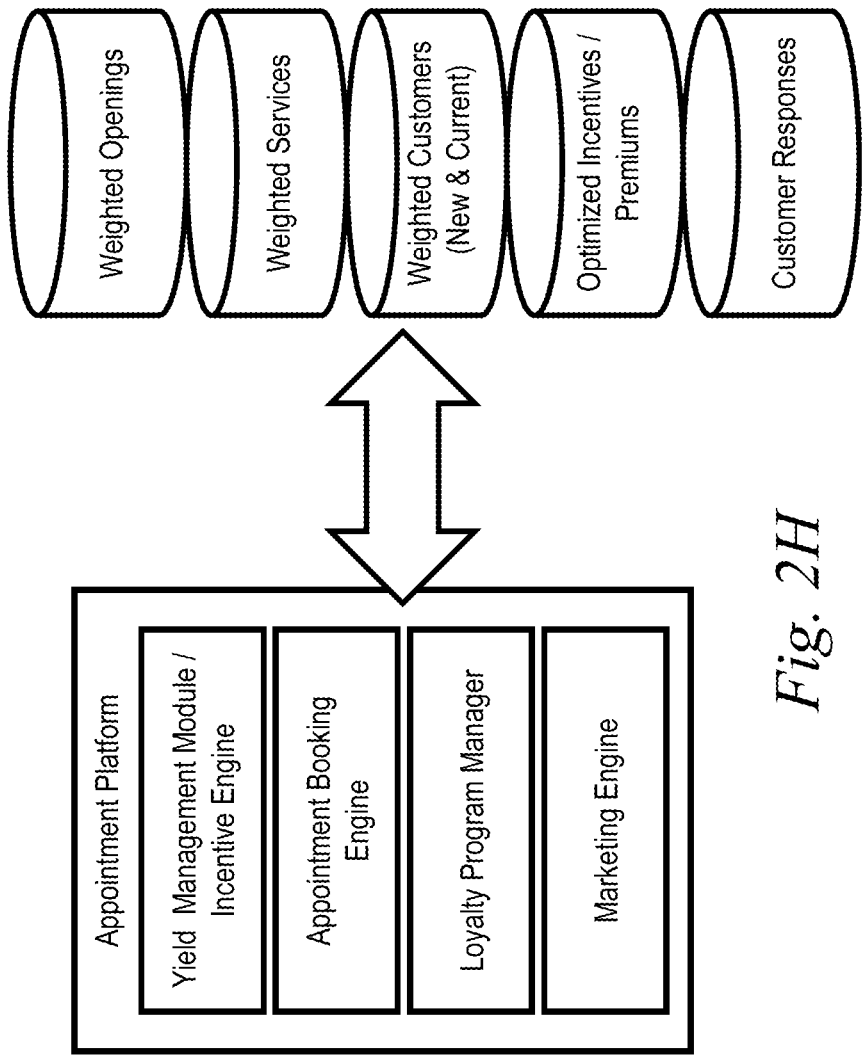
FIG. 2H is a diagram depicting an embodiment of a system and method for providing intermediate data exchange and optimization.

Referring now to FIG. 2H, one embodiment of a system and method for providing intermediate data exchange and optimization is depicted. With the incentives and premiums optimized based on the demand (e.g., based on current customer responses and historical data), and the customers waiting for these services weighted based on predetermined factors, the appointment platform can take inventory of weighted openings and/or weighted services.

With regards to determining weighted openings, all openings may not be treated or ranked the same by the appointment platform. Time slots can be weighted based on time of the day, day of the week, month of the year, seasons, length of the time slot, and calendars (for example, school or holiday schedules). Typical premium time slots, such as those scheduled before work/school and after work/school, and on weekends, can be weighted to require a premium or no incentive. Off-peak times, e.g., based on historical data and current demand, can be weighted to require an incentive.

With regards to determining weighted services, services can be weighted by the system based on the amount or potential value of gross margins and/or revenue. The higher gross margin and/or revenue services can be weighted higher than other services. Requests for higher margin services can be used as input to the system to determine which customer gets the offer, and in what order if there are multiple requests for the same opening.

Figure 2I:
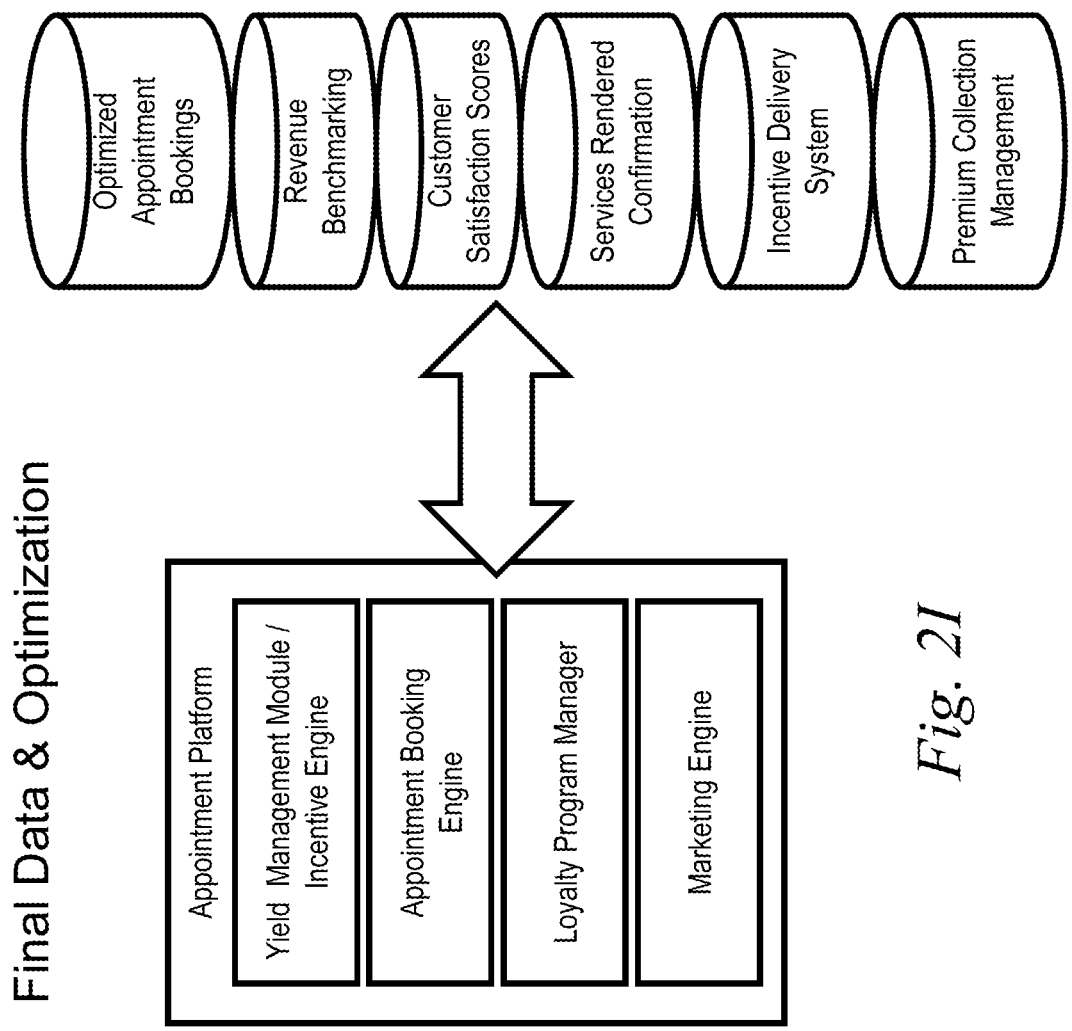
FIG. 2I is a diagram depicting an embodiment of a system and method for providing final data and optimization.

Referring now to FIG. 2I, one embodiment of a system and method for providing final data and optimization is depicted. The appointment platform may generate what may be referred to as "final data", which may include data for automatically populating the service providers' appointment books along with the analytics and workflow to make a determination or recommendation on which scenarios may produce the highest margin returns. In some embodiments, the data presented to the user through the service provider interface can include any one or more of: (a) Optimized Appointment Bookings, (b) Revenue Benchmarking, (c) Customer Satisfaction Scores, (d) Services Rendered Confirmation, (e) Incentive Delivery Mechanism, and (f) Premium Collection Management.

With respect to Optimized Appointment Bookings, the service provider can be presented with what-if appointment booking scenarios that show the different customer requests along with analytics to best fill-in their openings while maximizing revenues. The service provider can then decide based on revenue potential which scenario to choose for configuring the appointment platform. With regards to Revenue Benchmarking, the system can measure the effectiveness of the system's appointment booking optimization based on historical data. Benchmark data may provide another reference point for the system to automatically fill the calendar or allow the service provider to make better decisions when presented with multiple scenarios. With regards to Customer Satisfaction Scores, this data can be used by the appointment platform to track feedback from the user once services and incentives have been delivered, and may allow both the service provider and the appointment platform to continuously improve operations.

With regard to Services Rendered Confirmation data, the system can generate or use such data based on verification that services are rendered. For contractual purposes for example, the appointment platform may only get paid if services are rendered. The system can electronically verify with both the service provider and user that services are rendered. With regards to Incentive Delivery Mechanism data, such data can allow service providers and the appointment platform to track whether incentives have been delivered. Depending on the incentive, this data may be a tracking number or an electronic confirmation from the reward/incentive provider (e.g., VISA, Amex, Amazon, etc). With respect to Premium Collection Management data, the system can generate or use this to track whether a customer has used his/her loyalty points, or has paid premium fees to get access to peak appointments (e.g., typically before or after work/school) or in-demand services (e.g., haircuts with the top stylists, access to the best specialists). Loyalty points (e.g., instead of premium fee payments) may be used in cases where the service providers' fees are regulated (e.g., by health insurance providers).

Figure 2J:
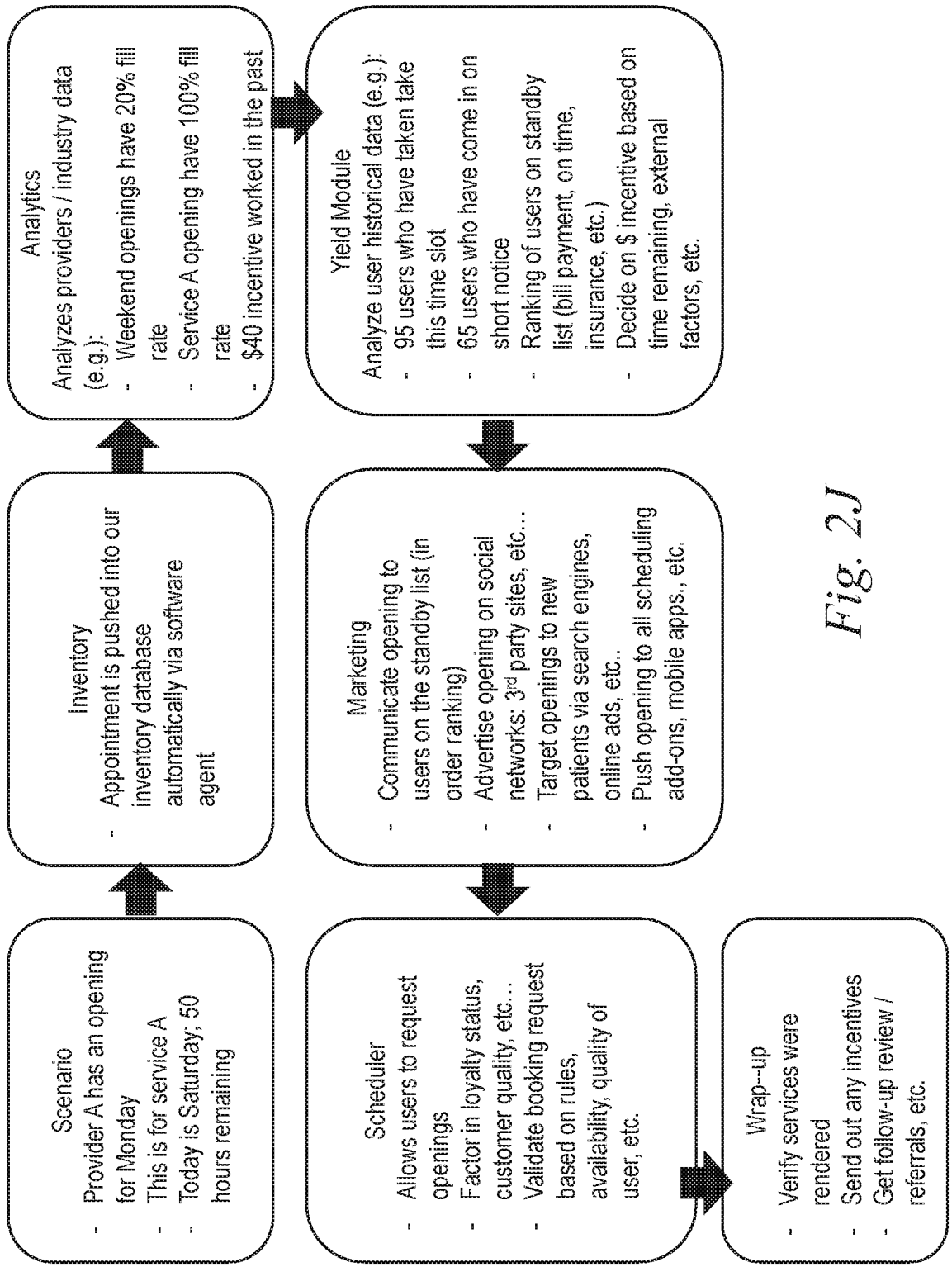
FIG. 2J is a diagram depicting an illustrative embodiment of an appointment platform workflow.

Referring now to FIG. 2J, one illustrative embodiment of an appointment platform workflow is depicted. In this workflow instance, for example, a service provider may have opted for a configuration which allows the modules of the appointment platform to maximize the provider's yield. The inventory, analytics, scheduler, marketing, yield module, and wrap-up portions of the workflow may operate in accordance with the systems and methods discussed in connection with FIGS. 2A-2I and 2Q.

Figure 2L:
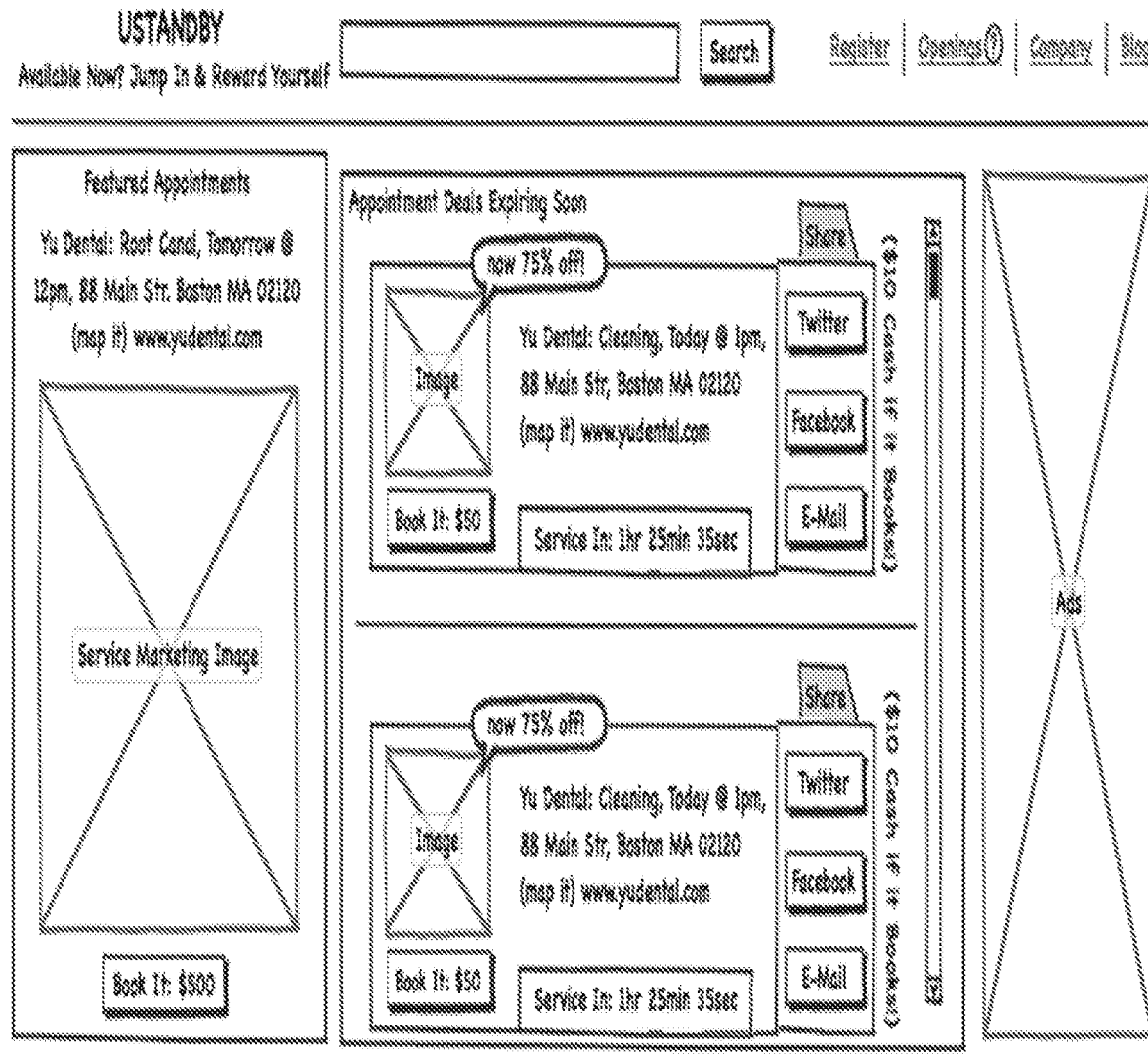
Figure 2M:
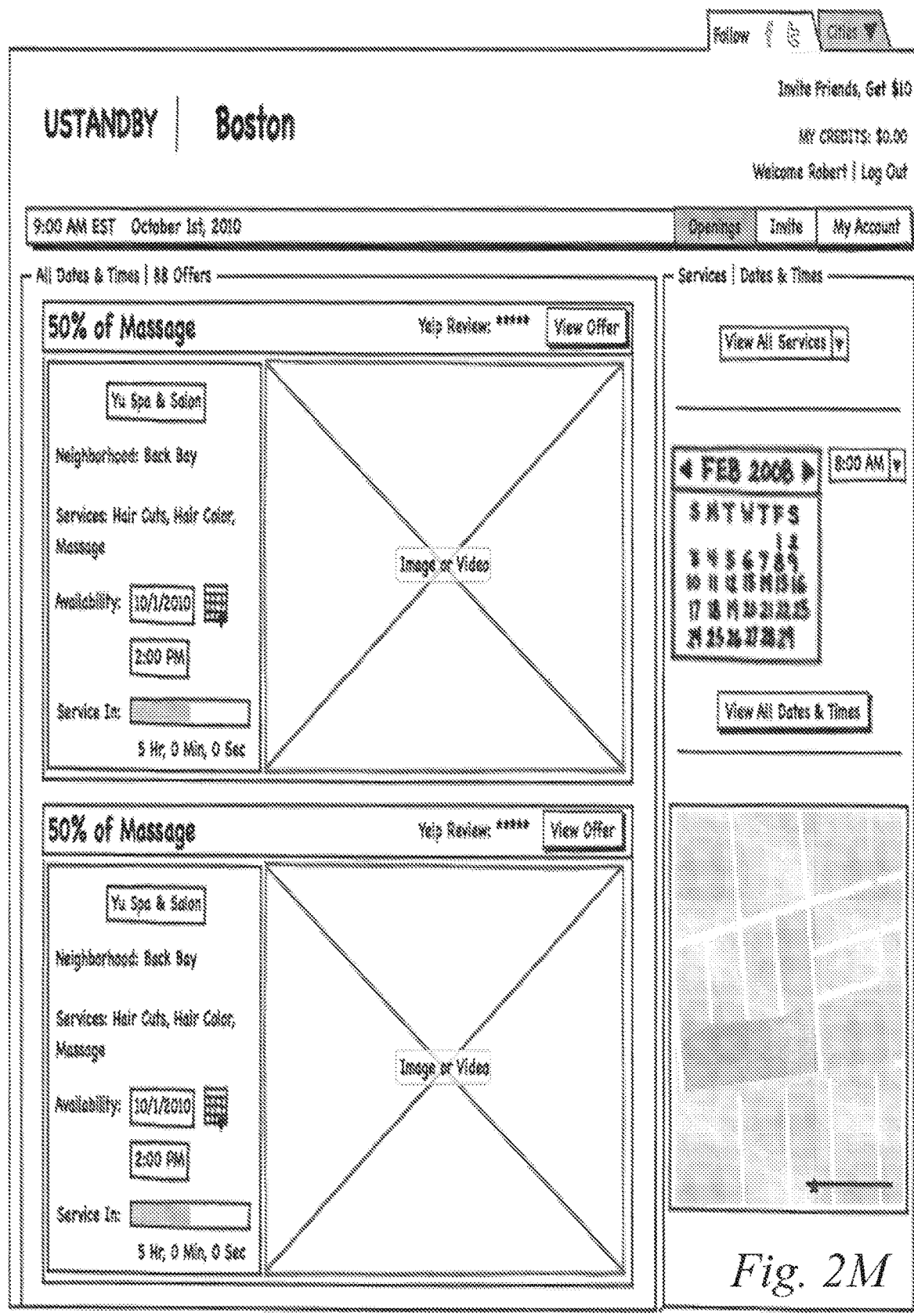
Figure 2N:
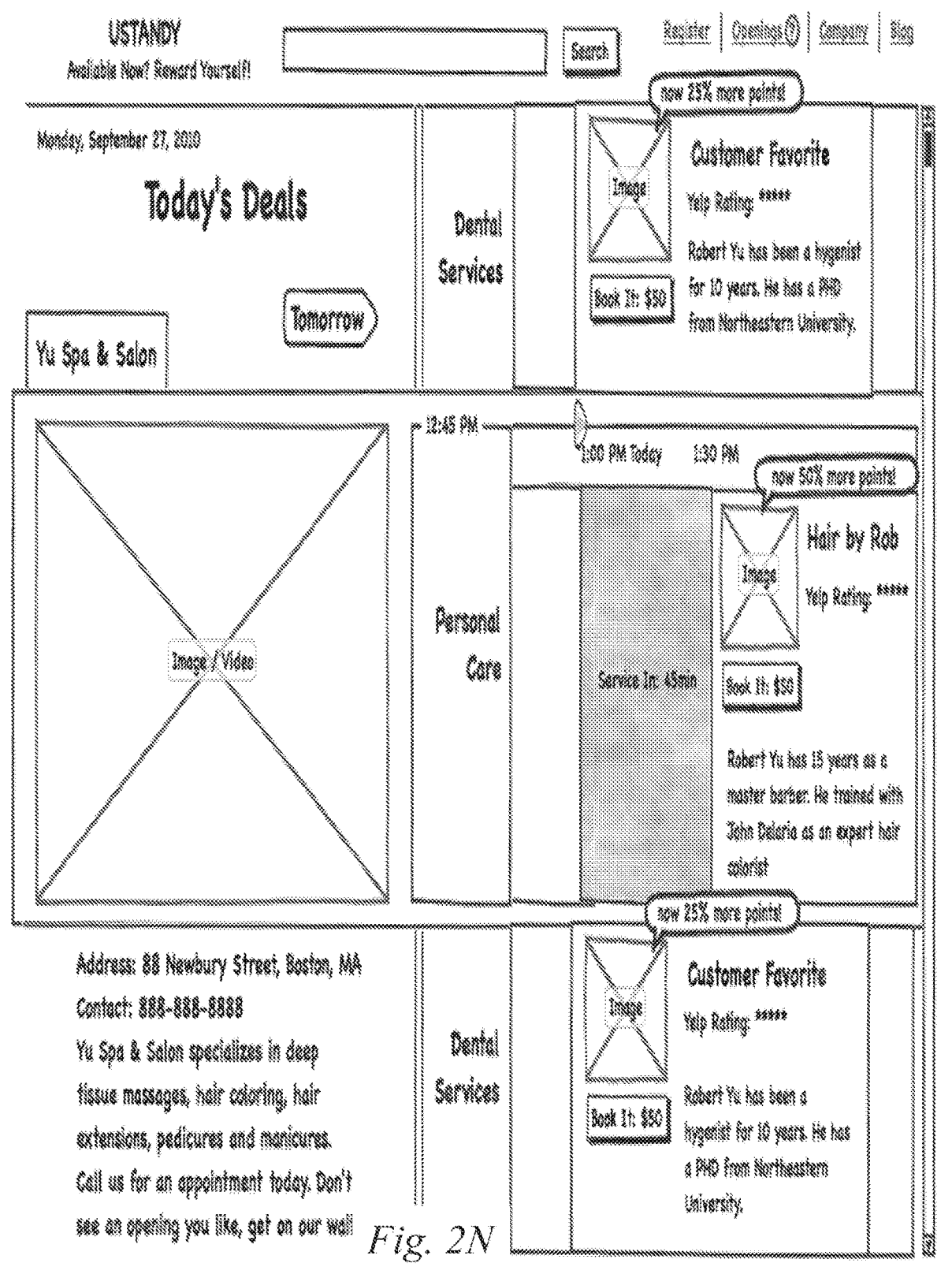
Figure 2P:
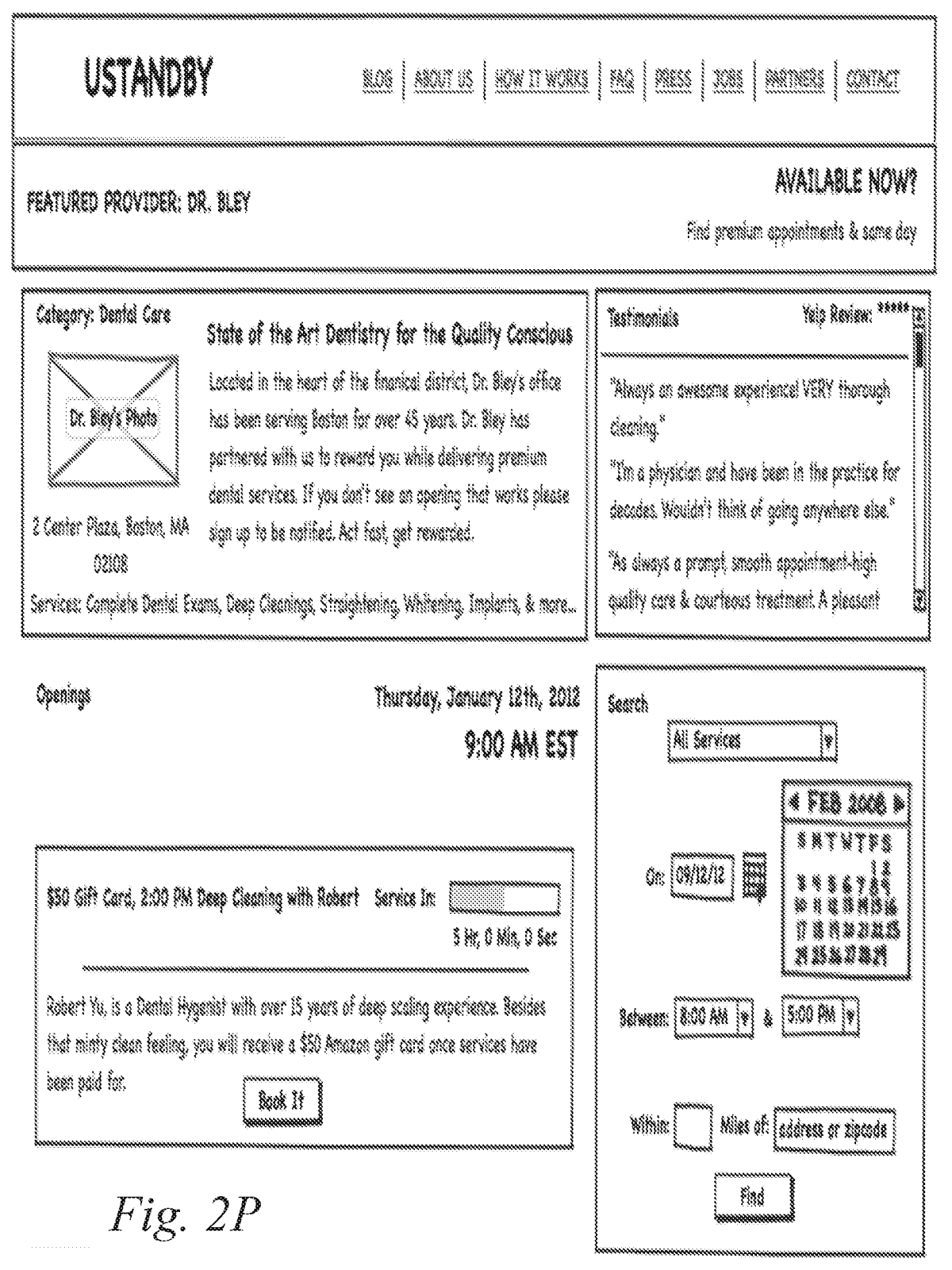
Figure 20:

FIGS. 2K-2P depict embodiments of screenshots depicting interfaces provided by an optimized online marketing and scheduling system disclosed herein. For example, FIG. 2K depicts one version of a landing page that features a rotating carousel with offers from featured service providers. The landing page provides a short description of the appointment platform's process for finding service deals. FIG. 2L depicts one version of a landing page that features a more detailed description of offers from a variety of service providers. This page provide an intuitive interface for a user to figure out how to browse and filter the services available. The incentives and opening can be updated from the appointment platform. FIG. 2M depicts one version of a landing page that is focused on services offered within a city. The incentives and opening can be updated from the appointment platform. FIG. 2N depicts one version of a landing page focusing op a time based presentation of services available. Each of the incentives and opening may be updated from the appointment platform, FIG. 2O depicts one embodiment of an interface that registered users can use to create, modify, and save their searches. This interface can also allow users to setup notifications. FIG. 2O depicts one embodiment of an page for a service provider, and may be referred to as a microsite. The openings and rewards may be specific to the service provider. Adjacent services or partner services may be featured on such a page.

In some embodiments, the appointment platform can access, track and/or manage service plan recommendations for a user. The appointment platform can do so on behalf of a provider or a user. The service plan recommendations may be from a provider, government agency, or a health authority, for example. For example, based on an initial or ongoing assessment of a user's service needs, a service plan may drive future service recommendations and intervals for these services. The system can automatically generate incentives and/or messaging to ensure that a user or customer follows the recommended services. The system may rank or assign weights to users to determine who to offer an open appointment, based on their service plan recommendations or needs. The system may manage a service provider's work flow by keeping metrics on which customers have followed the service plan recommendations, as well as customers who represent a revenue opportunity. The loyalty rewards program managed by the loyalty program manager may also drive incentives as well as the availability of services to the customer.

Figure 2Q:
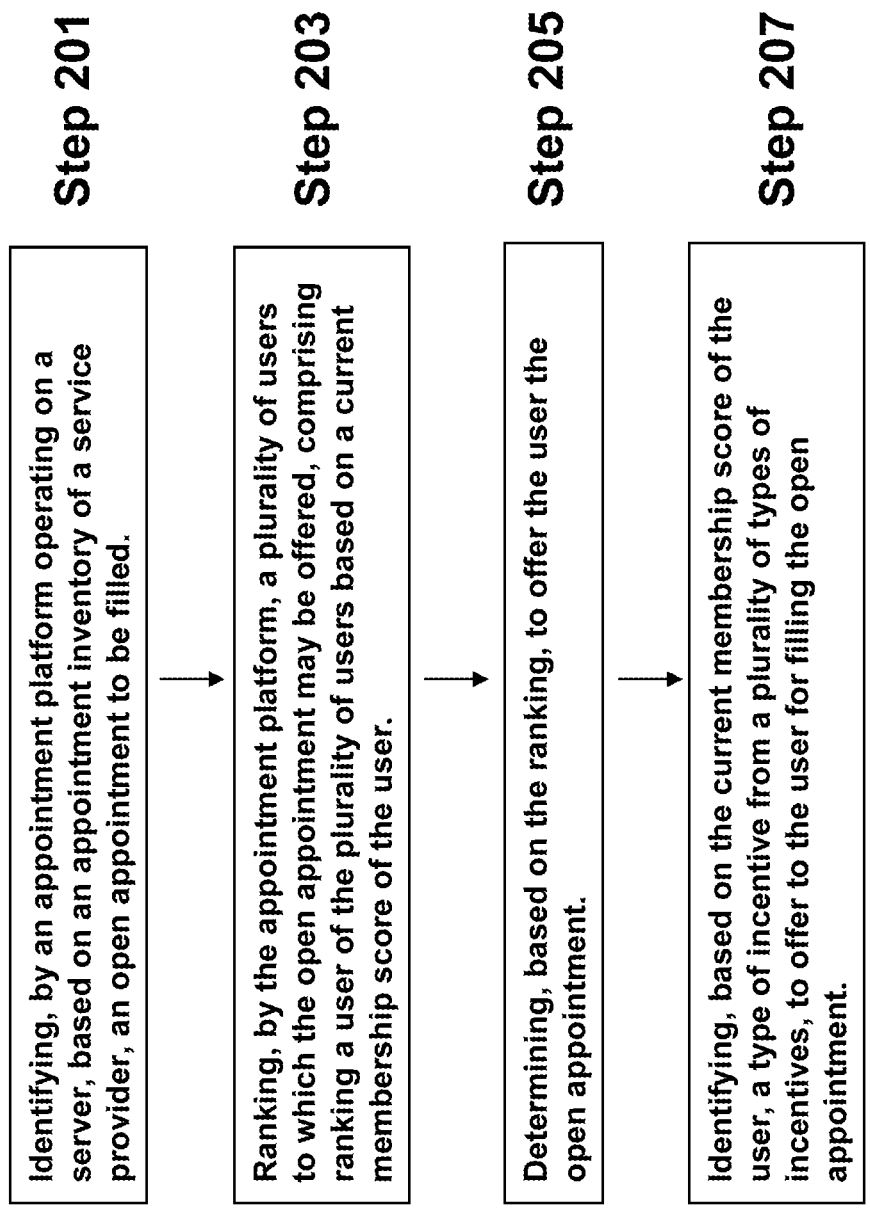
FIG. 2Q is a flow diagram of an embodiment of an optimized online marketing and scheduling method based on driving demand for services.

Referring now to FIG. 2Q, one embodiment of an optimized online marketing and scheduling method based on driving demand for services is depicted. The method may include identifying, by an appointment engine of an appointment platform operating on a server, based on an appointment inventory of a service provider, an open appointment to be filled (201). The appointment engine may rank a plurality of users to which the open appointment may be offered (203). The appointment engine may rank a user of the plurality of users based on a current membership score of the user. The appointment engine may determine, based on the ranking, to offer the user the open appointment (205). An incentive engine may identify, based on the current membership score of the user, a type of incentive from a plurality of types of incentives, to offer to the user for filling the open appointment.

In further details of (201), an appointment engine operating on a server may identify, based on an appointment inventory of a service provider, an open appointment to be filled. An appointment platform may identify, via the appointment engine, an open appointment to be filled. The appointment engine may request for, collect, or otherwise access data of the appointment inventory via any of the interfaces and methods described above in connection with FIGS. 2A and 2B. For example, a software agent of the appointment platform may be installed on a system of the provider, to access the provider's inventory data dynamically or based on an access schedule, on behalf of the appointment engine. In some embodiments, the appointment platform may provide a web interface session or other connection with which a provider may input, post or upload inventory data or updates. The appointment platform may provide an operator-assisted interface to the provider to receive inventory data or updates.

In some embodiments, the appointment engine may access a booking schedule, calendar or other record of the provider, from which an open appointment may be identified. The appointment engine may access a provider's inventory through a third-party provider or publisher. In other embodiments, the appoints lent engine may receive information regarding specific appointment slots that are available, and/or services that may be offered with these slots, from the provider for example. The appointment engine may receive or access any type or form of provider analytics, for example, one or more types of analytics discussed above in connection with FIGS. 2A-2C, via any embodiment of the interfaces disclosed herein.

In certain embodiments, the appointment engine may rank or determine a prioritized weight for the open appointment in relation to one or more other open appointments. The appointment engine may determine a priority or sequence in processing open appointments, based on the ranking or corresponding weight. The appointment engine may rank or assign a weight to the open appointment based on one or more of the factors discussed above in connection with FIGS. 2C-2E and 2G-2H, for example, historical demand for a similar appointment slot, duration of the slot (which may accommodate certain types of services), and time remaining to the appointment. Based on the ranking or assigned weight of the open slot, the appointment engine will determine a time or order to offer the open appointment for booking.

In further details of (203), the appointment engine may rank a plurality of users to which the open appointment may be offered. The appointment engine may rank a user of the plurality of users based on a current or updated membership score of the user. The appointment engine may rank the user based on the current membership score, the current membership score determined based on at least one of: a past appointment record of the user (e.g., attendance record, punctuality, cancellation or rescheduling record), a past payment record of the user (e.g., promptness in payment and/or any balance yet to be paid), a record of services consumed or scheduled by the user (e.g., the value or types of services consumed or requested), length of the user's membership (e.g., with the appointment platform, or relationship with the provider or the provider's network), the user's adherence to the provider's service recommendations (e.g., whether the user is due for a particular service, and whether the user is compliant or cooperative with respect to the service recommendations), revenue potential from the user (e.g., based on demographics or the user's insurance fee caps, or a likelihood of the user requiring a high value service), proximity of the user to the service provider's location (e.g., a higher likelihood of the user's availability, based on convenience) which may be determined dynamically and/or in real time (e.g., via GPS tracking or WiFi locator), and the user's insurance plan or other payment method for service rendered by the service provider (e.g., insurance pay-out rates and limits, rate of rejected claims, and time to process payments). The appointment engine may rank a user of the plurality of users, or determine a membership score based on the membership status or privilege level of the user (e.g., a platinum, gold, silver or bronze user). The appointment engine may determine the current membership score based on any of the factors discussed above in connection with FIGS. 2C-2E and 2G-2H.

The appointment engine may rank the plurality of users comprising at least one of: wait-listed users, users booked for a different appointment, and users due for an appointment. The appointment engine may rank the plurality of users which may include new users or former customers. The appointment engine may identify a subset of the appointment platform's users to which to potentially offer the open appointment. For example, the engine may identify existing customers of a provider, or identify a user segment based on user preferences, demographics and/or affinity to services offered by the provider. The appointment engine may identify users that are currently physically proximate to the provider's location, e.g., if the open appointment is within a short timeframe from the present. The appointment engine may identify users whose residential or work address is near the provider's location. The appointment engine may identify users based on a waitlist or standby list (e.g., for the open slot, or for another slot proximate to the open slot). The appointment engine may identify users that have signed up for a related alert notification.

In some embodiments, the appointment engine may target users interested in a service offered with the open appointment, but already booked for another slot (which may be more easily filled, or for which there is a ready taker). The appointment engine may target users that recently cancelled an appointment (e.g., with the possibility that one of such users may take up the open appointment based on a continuing need for the same service). The appointment engine may target users due for a particular service, e.g., based on a recommended service plan, or a history/pattern of consumption of the service. In certain embodiments, the appointment engine may target new users to expand a provider's client base.

In some embodiments, the appointment engine ranks or weight each of the identified or targeted users. The appointment engine may set a higher weight or preference to one or more users based on certain user attributes (e.g., new users, or long time customers of the provider). The appointment engine may select and/or rank a set of users responsive to availability of an open slot. The appointment engine may calculate or update a membership score of a user responsive to availability of the open slot. The appointment engine may calculate or update the membership score based on accrued loyalty rewards and/or incentives of the user.

In further details of (205), the appointment engine may determine, based on the ranking, to offer the user the open appointment. The appointment engine may determine to offer one or more users the open appointment, based on their ranking or updated membership scores. The appointment engine may determine to make the offer to one or more of the highest ranked users, or users having the highest membership scores. In certain embodiments, the appointment engine selects a pre-defined number of highest-ranked users from the plurality of users, to which the open appointment is offered. The appointment engine may select a pre-defined number of highest-ranked users from the plurality of users, to which the open appointment is offered, and may assign the open appointment to a first user from the highest-ranked users to accept the offer. In some embodiments, the appointment engine may offer all ranked users the open appointment, e.g., with different incentives. In some scenarios, the appointment engine may not send an offer to a user who has received an offer in an earlier round. In some of these scenarios, the user's ranking may have been adjusted based on any factor discussed above, or lack of action in the earlier round.

In some embodiments, the appointment engine may determine to concurrently offer the open appointment to a group of users. In certain embodiments, the appointment engine may determine to offer the open appointment sequentially or in an overlapping manner to a group of ranked user, for example, until one of the users accepts the offer. The appointment engine may send an offer to specific users or groups of users (e.g., highly ranked or preferred users) according to a schedule or priority. The appointment engine may send an offer to additional users (e.g., lower-ranked users) based on a lack of initial response from offered users, or based on other factors (e.g., weather changes, local conditions).

In further details of (207), an incentive engine may identify, based on the current membership score of the user, a type of incentive from a plurality of types of incentives, to offer to the user for filling the open appointment. The incentive engine may identify a type and/or level of incentive to the user based on the ranking of the user, which may be based on the user's membership score. Responsive to, or after determining that a particular user is to be offered the open appointment, the incentive engine may determine a type and/or level of incentive to offer. For example, the incentive engine may identify the type of incentive to the user if it is determined that the user meets a membership score or ranking threshold. The incentive engine may not identify an incentive for users yet to be identified for receiving the offer. The incentive engine may not identify an incentive for users determined to be excluded from the offer.

In some embodiments, the incentive engine may determine an incentive or a range of incentives for a user prior to an open appointment being identified. For example, the incentive engine may determine or predetermine the incentive or the range of incentives based on a preference of the user, or the user's membership level (e.g., a valued member, such as a platinum or gold member). The incentive engine may dynamically adjust the incentive or select from the range based on additional factors introduced by a specific opening.

The incentive engine may identify the type or a level of incentive based at least in part on one or more of: weather condition (e.g., rain or snow storm, which may introduce difficulty or inconvenience to a user in accepting the opening and/or adhering to the appointment), and/or local condition (e.g., an ongoing, scheduled and/or predicted event, may introduce difficulty or inconvenience to the user). For example, a parade, serious accident, road closures at an appointed time, or a construction project could disrupt traffic and access to the provider location.

The incentive engine may factor in the amount of time remaining to an open appointment, to identify an appropriate incentive. For example, the appointment platform may offer a more attractive incentive so as to have a higher probability of attracting a customer to take up an appointment at short notice. As the time remaining for filling up an appointment decreases, the appointment platform may make the incentive more attractive. In some cases, for example when the provider's costs of setting up equipment and/or personnel to prepare for a specific service and/or appointment may increase due to short notice, the appointment engine may adjust the incentive according (for example, reducing the level of incentive to maintain profit margins or reduce operating costs). In certain embodiments, the appointment engine may determine the incentive to offer based on the amount of interest from users at that time, for example, through real time data collected on requests or page views on a particular service or appointment time, or data from a current waitlist.

The incentive engine may identify the type or a level of the incentive based on one or more of: historical appointment utilization data from the service provider, and a type of service offered with the open appointment. The incentive engine may identify the incentive based on an analysis of historical booking, cancellation and/or no-shows patterns. The incentive engine may identify the incentive based on a projection of appointment utilization based on past or recent trends. The incentive engine may identify the incentive based on a type of service offered with the open appointment. For example, the appointment engine may rank or assign weights to the types of available services, as described above in connection with FIGS. 2C-2F, and may confer a premium on specific services. By way of illustration, the incentive engine may confer a better incentive for a service appointment that commands a higher profit margin or revenue potential.

The incentive engine may identify a type of incentive comprising at least one of: a reward point, a membership upgrade or an online badge (e.g., platinum member), access to premium services or benefits, a credit towards future services, a gift card, voucher, coupon or certificate, and a discount (e.g., on a follow-up or future service). In some embodiments, the incentive engine may identify a type of incentive that excludes or avoids discounts on services offered via open appointments. The incentive engine may be configured to exclude or avoid offering straight discounts to services so as to promote user loyalty to the provider and/or the appointment platform using alternative incentives (e.g., loyalty rewards, a coupon to redeem future services in part or in whole, a gift card that may only be redeemable at select providers, or raising the membership score or level of the user for better or easier access to premium benefits). The incentive engine may be configured to avoid offering straight discounts so as to protect a provider's list price or market rate for services, or prestige associated with a premium service or provider.

In certain embodiments, the incentive engine may identify an incentive of cash or cash value to a user, which may be available after payment for services rendered. For example, instead of discounting a service by 25%, and lowering a perceived value of the service and provider, the appointment platform may offer a post-transaction cash incentive. By way of illustration, for a $400 dental job, the incentive engine may offer an incentive of $100 to a user to take that appointment. The user still pays $400 to the provider at the point of service, but the user benefits from a cash payout or credit after completion of the transaction.

In certain embodiments, the incentive engine may schedule delivery of an incentive upon completion of the service or transaction (e.g., the user turns up, and/or payment for the appointment is complete). For example, upon receiving a confirmation or notification via a provider interface that payment or payment information has been received, the incentive engine may deliver a predetermined incentive to the corresponding customer. The appointment platform may provide an interface to receive or generate the incentive immediately upon completion of a service or payment transaction. The appointment platform may provide an interface for a provider or user to receive, generate and/or redeem the incentive, e.g., to receive are emailed coupon or electronic gift card, to generate a printout of a voucher. The appointment platform may provide a mobile device app or web interface to a user for maintaining and activating redemption of an incentive.

In some embodiments, the incentive engine may offer an increase or upgrade in the incentive based on user actions, such as prompt payment after the service, punctuality for the appointment, and completing a review or survey related to the appointment. The appointment platform may promote the additional incentive(s) to potential takers of an opening, or an accepted customer, to encourage positive behavior or other user action, and/or to improve provider experience.

In some embodiments, the appointment engine may rank accepted offers from a plurality of users (e.g., accepted offers received concurrently or within a short period of time). The appointment engine may rank the accepted offers to determine which one to fill the open appointment. The appointment engine may rank the accepted offers based on one or more factors including but not limited to the time of the accepted offer, the ranking of a corresponding user, the type and/or level of incentive offered. The appointment engine may rank the accepted offers based on any one or more of the factors used to rank an individual user.

In some embodiments, the appointment engine updates the user's membership score based on at least one of: the user accepting to fill the open appointment, the user's subsequent cancellation of the appointment, the user's attendance at or absence from the appointment, and the user's punctuality at the appointment. The appointment engine may update the user's loyalty rewards or loyalty status with a corresponding provider, or with respect to the appointment platform, based on any such user action, behavior or events. In certain embodiments, the appointment engine may maintain a user's membership score as separate components (e.g., consumption volume, cancellation/rescheduling frequency), so as to provide categorical tracking and weighting, e.g., for ranking purposes. The appointment engine may dynamically update a user's membership score to enable up-to-date processing of a user's transactions (through the appointment platform).

It should be understood that the system's described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A system comprising:
an appointment engine comprising one or more processors, the appointment engine configured to:
identify, via a first interface, an appointment with a service provider to be filled, and a first user for selection of the appointment, the first user associated with a first client;
identify a plurality of situational factors related to the first user and to the first client associated with the user in the selection of the appointment;
determine, at a first time instance prior to a time of the appointment, according to conditions of the plurality of situational factors, a first type and level of incentive to include in a first prompt to the first user for the selection of the appointment;
determine, at a second time instance after the first time instance and prior to the time of the appointment corresponding to the second time instance, according to conditions of the plurality of situational factors, a second type and level of incentive to include in a second prompt to the first user for the selection of the appointment;
provide, via a second interface to the first client, an electronic message to present the first prompt and the second prompt for selection of the appointment by the first user;
determine that the first user has selected the second prompt associated with the second type and level of incentive from the electronic message presented to the first client, and has completed requirements of the appointment specified by the second prompt; and
release, responsive to the determination, the second type and level of incentive to the first user.

2. The system of claim 1, further comprising a messaging system configured to communicate the first prompt and the second prompt to the first client associated with the first user.

3. The system of claim 1, wherein the appointment engine is further configured to monitor the plurality of situational factors over time, the plurality of situational factors including at least one of: proximity in time to the time of the open appointment, a location of the first user or the service provider, local condition of the location, weather condition, an appointment record of the first user, a payment record of the first user, a record of services consumed or scheduled by the first user, the first user's adherence to the provider's service recommendations, revenue potential from the first user, or the first user's insurance plan or other payment method for service rendered by the service provider, or demand or interest from users for the corresponding service.

4. The system of claim 1, wherein the first type and level of incentive or the second type and level of incentive comprises at least one of: a reward point, a credit towards future services, a gift card or certificate, or a discount.

5. The system of claim 1, wherein the appointment engine is configured to identify the first user from a plurality of users, according to at least one of: proximity of the first user to the service provider's location, a past appointment record of the first user, a past payment record of the first user, a record of services consumed or scheduled by the first user, the first user's adherence to the provider's service recommendations, revenue potential from the first user, or the first user's insurance plan or other payment method for service rendered by the service provider.

6. The system of claim 1, wherein the appointment engine is configured to identify the open appointment to be filled, according to an appointment inventory of the service provider accessed via an interface configured for the service provider.

7. The system of claim 1, wherein the appointment engine is further configured to:
determine, prior to the time of the appointment, that the first user has selected the second prompt;
determine a third type and level of incentive to include in a third prompt to the first user, to allow the appointment to be filled by a second user; and
communicate the third prompt to the first user.

8. The system of claim 7, wherein the third prompt comprises a notification to the first user for swapping appointments with the second user.

9. The system of claim 7, wherein the third type and level of incentive is at least based on a contribution or an offer from the second user.

10. The system of claim 1, wherein the appointment engine is further configured to:
determine, prior to the time of the appointment, that the first user has accepted the second prompt; and
communicate to a second user, a selection from the first user to allow the second user to fill the appointment in place of the first user.

11. A method comprising:
identifying, by an appointment engine comprising one or more processors via a first interface, an appointment with a service provider to be filled, and a first user for selection of the appointment, the first user associated with a first client;
identifying, by the appointment engine, a plurality of situational factors related to the first user and to the first client associated with the user in the selection of the appointment;
determining, by the appointment engine at a first time instance prior to a time of the appointment, according to conditions of the plurality of situational factors, a first type and level of incentive to include in a first prompt to the first user for selection of the appointment;
determining, by the appointment engine at a second time instance after the first time instance and prior to the time of the appointment, according to conditions of the plurality of situational factors corresponding to the second time instance, a second type and level of incentive to include in a second prompt to the first user for the selection of the appointment;
providing, by the appointment engine via a second interface to the first client, an electronic message to present the first prompt and the second prompt for selection of the appointment by the first user;
determining, by the appointment engine, that the first user has selected the second offer associated with the second type and level of incentive from the electronic message presented via the first client, and has completed requirements of the appointment specified by the second prompt; and
releasing, by the appointment engine responsive to the determination, the second type and level of incentive to the first user.

12. The method of claim 11, further comprising communicating, via a messaging system, the first prompt and the second prompt to the first client associated with the first user.

13. The method of claim 11, further comprising monitoring, by the appointment engine, the plurality of situational factors over time, the plurality of situational factors including at least one of: proximity in time to the time of the open appointment, a location of the first user or the service provider, local condition of the location, weather condition, an appointment record of the first user, a payment record of the first user, a record of services consumed or scheduled by the first user, the first user's adherence to the provider's service recommendations, revenue potential from the first user, or the first user's insurance plan or other payment method for service rendered by the service provider, or demand or interest from users for the corresponding service.

14. The method of claim 11, wherein the first type and level of incentive or the second type and level of incentive comprises at least one of: a reward point, a credit towards future services, a gift card or certificate, or a discount.

15. The method of claim 11, comprising identifying, by the appointment engine, the first user from a plurality of users, according to at least one of: proximity of the first user to the service provider's location, a past appointment record of the first user, a past payment record of the first user, a record of services consumed or scheduled by the first user, the first user's adherence to the provider's service recommendations, revenue potential from the first user, or the first user's insurance plan or other payment method for service rendered by the service provider.

16. The method of claim 11, comprising identifying, by the appointment engine, the open appointment to be filled, according to an appointment inventory of the service provider accessed via an interface configured for the service provider.

17. The method of claim 11, further comprising:
determining, prior to the time of the appointment, that the first user has selected the second prompt;
determining a third type and level of incentive to include in a third prompt to the first user, to allow the appointment to be filled by a second user; and
communicating the third prompt to the first user.

18. The method of claim 17, wherein the third prompt comprises an offer to the first user for swapping appointments with the second user.

19. The method of claim 17, wherein the third type and level of incentive is at least based on a contribution or an offer from the second user.

20. The method of claim 11, further comprising:
determining, prior to the time of the appointment, that the first user has accepted the second prompt; and
communicating to a second user, a selection from the first user to allow the second user to fill the appointment in place of the first user.

\* \* \* \* \*